United States Patent
Zamani et al.

(10) Patent No.: US 11,871,485 B2
(45) Date of Patent: Jan. 9, 2024

(54) VERIFICATION OF INTERACTIONS SYSTEM AND METHOD

(71) Applicant: Visa International Service Association, San Francisco, CA (US)

(72) Inventors: Mahdi Zamani, Palo Alto, CA (US); Lucianna Kiffer, San Francisco, CA (US); Loi Luu, Mountain View, CA (US); Karl Benedikt Bunz, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 577 days.

(21) Appl. No.: 16/636,313

(22) PCT Filed: Aug. 9, 2018

(86) PCT No.: PCT/US2018/046101
§ 371 (c)(1),
(2) Date: Feb. 3, 2020

(87) PCT Pub. No.: WO2019/032891
PCT Pub. Date: Feb. 14, 2019

(65) Prior Publication Data
US 2022/0116223 A1 Apr. 14, 2022
US 2022/0311619 A9 Sep. 29, 2022

Related U.S. Application Data

(60) Provisional application No. 62/543,259, filed on Aug. 9, 2017.

(51) Int. Cl.
*H04L 29/06* (2006.01)
*H05B 3/56* (2006.01)
(Continued)

(52) U.S. Cl.
CPC ............... *H05B 3/565* (2013.01); *H01B 1/02* (2013.01); *H01B 7/0225* (2013.01); *H01B 7/28* (2013.01);
(Continued)

(58) Field of Classification Search
None
See application file for complete search history.

(56) References Cited

U.S. PATENT DOCUMENTS 11,233,656 B2 * 1/2022 Karame .................. G09C 1/00
11,308,106 B1 * 4/2022 Muralimanohar ...... G06F 16/27
(Continued)

FOREIGN PATENT DOCUMENTS

| DE | 2017212809 | * | 7/2017 |
|----|------------|---|--------|
| WO | 2016029119 |   | 2/2016 |
| WO | 2019032891 |   | 2/2019 |

OTHER PUBLICATIONS

B, Laurie, Certificate Transparency, Jun. 2013, Internet Engineering Task Force {IETF} (Year: 2013).*
(Continued)

*Primary Examiner* — Eleni A Shiferaw
*Assistant Examiner* — Hassan A Hussein
(74) *Attorney, Agent, or Firm* — Kilpatrick Townsend & Stockton LLP

(57) ABSTRACT

A node in a plurality of nodes can perform an identity set generation process. The node can then determine a leader node. The node may diffuse an identity set from each node of the plurality of nodes to the plurality of nodes. The node can then determine a majority set including identities occurring in at least one half of the identify sets, wherein the leader node diffuses the majority set of the leader node to the plurality of nodes. The node can verify the majority set of
(Continued)

the leader node. The node may then update the identity set based on the majority set of the leader node.

20 Claims, 10 Drawing Sheets

(51) Int. Cl.
| | |
|---|---|
| *H01B 1/02* | (2006.01) |
| *H01B 7/02* | (2006.01) |
| *H01B 7/28* | (2006.01) |
| *H01B 7/295* | (2006.01) |
| *H04L 9/32* | (2006.01) |
| *H05B 1/02* | (2006.01) |
| *H05B 3/04* | (2006.01) |
| *H05B 3/14* | (2006.01) |
| *H04L 9/00* | (2022.01) |
| *H01B 3/44* | (2006.01) |

(52) U.S. Cl.
CPC .......... *H01B 7/295* (2013.01); *H04L 9/3239* (2013.01); *H04L 9/3247* (2013.01); *H04L 9/3265* (2013.01); *H05B 1/0291* (2013.01); *H05B 3/04* (2013.01); *H05B 3/146* (2013.01); *H01B 3/441* (2013.01); *H04L 9/50* (2022.05); *H04L 2209/56* (2013.01); *H05B 2203/011* (2013.01); *H05B 2203/02* (2013.01); *Y02A 30/14* (2018.01)

(56) References Cited

U.S. PATENT DOCUMENTS

| | | | | |
|---|---|---|---|---|
| 11,310,775 | B2* | 4/2022 | Babaei | H04L 1/1874 |
| 2012/0078752 | A1* | 3/2012 | Hultberg | G06Q 20/045 |
| | | | | 705/26.41 |
| 2016/0072800 | A1* | 3/2016 | Soon-Shiong | G16B 50/00 |
| | | | | 726/7 |
| 2016/0330034 | A1* | 11/2016 | Back | G06Q 20/065 |
| 2017/0132619 | A1* | 5/2017 | Miller | G06Q 20/065 |
| 2017/0213289 | A1* | 7/2017 | Doney | G06Q 40/03 |
| 2017/0295023 | A1* | 10/2017 | Madhavan | G06F 21/40 |
| 2017/0344580 | A1* | 11/2017 | King | H04L 9/3247 |
| 2017/0364704 | A1* | 12/2017 | Wright | G06F 21/6227 |
| 2017/0366547 | A1* | 12/2017 | Goldfarb | H04L 63/10 |
| 2018/0020392 | A1* | 1/2018 | Eller | H04W 88/04 |
| 2018/0083786 | A1* | 3/2018 | Dierks | G06F 21/602 |
| 2018/0167198 | A1* | 6/2018 | Muller | H04L 9/0825 |
| 2018/0203992 | A1* | 7/2018 | Kilpatrick | G06F 21/44 |
| 2018/0205552 | A1* | 7/2018 | Struttmann | G06F 21/78 |
| 2018/0240114 | A1* | 8/2018 | Li | G06Q 20/401 |
| 2018/0285217 | A1* | 10/2018 | Smith | G06F 21/00 |
| 2018/0285838 | A1* | 10/2018 | Franaszek | H04L 9/3236 |
| 2018/0285983 | A1* | 10/2018 | Franaszek | G06Q 40/12 |
| 2018/0337770 | A1* | 11/2018 | Bathen | H04L 9/3239 |
| 2018/0337882 | A1* | 11/2018 | Li | H04L 61/35 |
| 2018/0341930 | A1* | 11/2018 | Moir | H04L 9/3247 |
| 2018/0359096 | A1* | 12/2018 | Ford | G06Q 20/29 |
| 2019/0034465 | A1* | 1/2019 | Shimamura | G06F 16/23 |
| 2019/0036887 | A1* | 1/2019 | Miller | H04L 9/3213 |
| 2019/0044734 | A1* | 2/2019 | Lancashire | H04L 9/3247 |
| 2019/0132138 | A1* | 5/2019 | Finlow-Bates | H04L 67/1097 |
| 2019/0296915 | A1* | 9/2019 | Lancashire | H04L 9/3247 |
| 2019/0349733 | A1* | 11/2019 | Nolan | H04L 67/1046 |
| 2019/0384748 | A1* | 12/2019 | Roennow | G06F 16/1837 |
| 2019/0394047 | A1* | 12/2019 | Karame | G06F 21/64 |
| 2020/0051076 | A1* | 2/2020 | Cichocki | G06Q 20/065 |
| 2020/0169416 | A1* | 5/2020 | Gouget | H04L 9/0877 |
| 2020/0186332 | A1* | 6/2020 | Moeller | H04L 9/30 |
| 2020/0252221 | A1* | 8/2020 | Zamani | H04L 9/0869 |
| 2020/0278963 | A1* | 9/2020 | Destefanis | H04L 9/3239 |
| 2020/0351106 | A1* | 11/2020 | Klein | H04L 63/18 |
| 2021/0152366 | A1* | 5/2021 | Wang | H04L 9/0861 |
| 2021/0157790 | A1* | 5/2021 | Zamani | H04L 9/50 |
| 2022/0114377 | A1* | 4/2022 | Subramanian | G06V 40/10 |
| 2022/0114584 | A1* | 4/2022 | Conley | G06Q 20/3674 |
| 2022/0116317 | A1* | 4/2022 | Goud Gadela | H04L 45/12 |

OTHER PUBLICATIONS

"A Next-Generation Smart Contract and Decentralized Application Platform", White Paper, Available Online at: https://github.com/ethereum/wiki/wiki/White-Paper, Accessed from Internet on Mar. 12, 2019, 49 pages.

"A Timestamping Proof Standard", Open Timestamps, Available Online at: https://opentimestamps.org/, Accessed from Internet on Mar. 11, 2019, 4 pages.

"Blockchain Size the Total Size of All Block Headers and Transactions. Not Including Database Indexes", blockchain.com, Available Online at: https://www.blockchain.com/charts/blocks-size?, Accessed from Internet on Mar. 11, 2019, 1 page.

"Blockchain Takes Way Too Long to Sync #2394", GitHub, Available Online at: https://github.com/ethereum/mist/issues/2394, May 31, 2017, 4 pages.

"Difficulty—Blockchain", Blockchain, Available online at: https://www.blockchain.com/en/charts/difficulty, Accessed from Internet on Mar. 11, 2017, 1 page.

"Ethereum Blocks", Available Online at: https://etherscan.io/blocks, Accessed from Internet on Mar. 11, 2019, 2 pages.

"Ethereum Contract for Bitcoin SPV: Live on https://etherscan.io/address/0x41f274c0023f83391de4e0733c609df5a124c3d4 http://btcrelay.org", GitHub, Available Online at: https://github.com/ethereum/btcrelay, Accessed from Internet on Mar. 11, 2019, 6 pages.

"Help:FAQ—Bitcoin Wiki", Available Online at: https://en.bitcoin.it/wiki/Help:FAQ, Accessed from Internet on Mar. 11, 2019, 16 pages.

"Hyperledger Sawtooth Documentation", Sawtooth v1.1.4 Documentation, Available Online at: https://sawtooth.hyperledger.org/docs/core/releases/latest/index.html, Accessed from Internet on Mar. 11, 2019, 1 page.

"Leaders in Blockchain-based Data Certification", Stampery, Available Online at: https://stampery.com/, Accessed from Internet Mar. 11, 2019, 8 pages.

"Over 175 Million Europeans Ready to Pay with Wearable Devices", Mastercard, Engagement Bureau, Feb. 22, 2018, 3 pages.

"The High-Value-Hash Highway", Bitcoin Forum, Aug. 7, 2012, pp. 1-11.

"Thin Client Security", Bitcoin Wiki, Available Online at: https://en.bitcoin.it/wiki/Thin_Client_Security, Accessed from Internet Mar. 11, 2019, 4 pages.

"Top 6 Vendors in the Wearable Payment Market from 2016 to 2020: Technavio", Business Wire, Technavio, Nov. 18, 2016, 5 pages.

"Visa Brings Secure Payment Solutions to the Internet of Things", Visa, Available Online at: https://usa.visa.com/visa-everywhere/innovation/visa-brings-secure-payments-to-internet-of-things.html, Accessed from Internet Mar. 11, 2019, 3 pages.

Bano et al., "SoK: Consensus in the Age of Blockchains", arXiv:1711.03936v2 [cs.CR], Available Online at: https://pdfs.semanticscholar.org/919e/32847097416aada92dff7c8274cd9ca55582.pdf XP55513744, Nov. 14, 2017, pp. 1-17.

Buterin, "Merkling in Ethereum", Available Online at: https://blog.ethereum.org/2015/11/15/merkling-in-ethereum/, Nov. 15, 2015, 9 pages.

Daian et al., "Snow White: Robustly Reconfigurable Consensus and Applications to Provably Secure Proof of Stake", Financial Cryptography and Data Security, 2019, pp. 1-65.

Dwork et al., "Pricing via Processing or Combatting Junk Mail", Advances in Cryptology-CRYPTO '92, Lecture Notes in Computer Science, 1993, pp. 139-147.

Dziembowski et al., "Proofs of Space", Advances in Cryptology-CRYPTO 2015, Lecture Notes in Computer Science, Aug. 1, 2015, pp. 585-605.

(56) References Cited

OTHER PUBLICATIONS

Gervais et al., "Tampering with the Delivery of Blocks and Transactions in Bitcoin", CCS '15 Proceedings of the 22nd ACM SIGSAC Conference on Computer and Communications Security, Oct. 12-16, 2015, 12 pages.
Gilad et al., "Algorand: Scaling Byzantine Agreements for Cryptocurrencies", SOSP '17 Proceedings of the 26th Symposium on Operating Systems Principles, Oct. 28-31, 2017, pp. 51-68.
Goldwasser et al., "Private Coins Versus Public Coins in Interactive Proof Systems", Proceeding STOC '86 Proceedings of the Eighteenth Annual ACM Symposium on Theory of Computing, May 28-30, 1986, pp. 59-68.
Hanke et al., "DFINITY Technology Overview Series Consensus System", Technology Overviews, Jan. 23, 2018, 16 pages.
Karp et al., "Randomized Rumor Spreading", Proceedings 41st Annual Symposium on Foundations of Computer Science, Nov. 12-14, 2000, 10 pages.
Kiayias et al., "Proof-of-Work Sidechains", Available Online at: https://fc19.ifca.ai/wtsc/PowSidechains.pdf, Oct. 30, 2018, 20 pages.
Laurie et al., "Certificate Transparency", Internet Engineering Task Force (IETF), ISSN: 2070-1721, Jun. 2013, 27 pages.
Mrekle, "A Digital Signature Based on a Conventional Encryption Function", Proceeding CRYPTO '87 A Conference on the Theory and Applications of Cryptographic Techniques on Advances in Cryptology, Aug. 16-20, 1987, pp. 369-378.
Nakamoto, "Bitcoin: A Peer-to-Peer Electronic Cash System", XP055131503, Available Online at: http://Nakamotoinstitute.org/static/docs/bitcoin.pdf, Oct. 31, 2008, pp. 1-9.
Pass et al., "Hybrid Consensus: Efficient Consensus in the Permissionless Model", Initiative for CryptoCurrency and Contracts (IC3), 2016, pp. 1-56.
PCT/US2018/046101, "International Preliminary Report on Patentability", dated Feb. 20, 2020, 6 pages.
PCT/US2018/046101, "International Search Report and Written Opinion Received", dated Jan. 3, 2019, 9 pages.
Poelstra, "Mimblewimble", Available Online at: https://download.wpsoftware.net/bitcoin/wizardry/mimblewimble.pdf, Oct. 6, 2016, pp. 1-19.
Saini, "Getting Deep Into Geth: Why Syncing Ethereum Node Is Slow", Available Online at: https://hackernoon.com/getting-deep-into-geth-why-syncing-ethereum-node-is-slow-1edb04f9dc5, Jul. 30, 2018, 6 pages.
Sharma, "What Is Ethereum's "Difficulty Bomb"?", Available Online at: https://www.investopedia.com/news/what-ethereums-difficulty-bomb/, Aug. 10, 2018, 7 pages.
Todd et al., "Merkle-Mountain-Range.md", GitHub, Available Online at: https://github.com/opentimestamps/opentimestamps-server/blob/master/doc/merkle-mountain-range.md, Accessed From Internet on Mar. 12, 2019, 2 pages.
Zamyatin et al., "(Short Paper) A Wild Velvet Fork Appears! Inclusive Blockchain Protocol Changes in Practice", 5th Workshop on Bitcoin and Blockchain Research, Financial Cryptography and Data Security 18, Apr. 18, 2018, 10 pages.
"Developer Guide—Bitcoin", XP055547572, Available Online at: https://web.archive.org/web/20160515171209/https://bitcoin.org/en/developer-guide, May 15, 2016, 95 pages.
EP18844755.1, "Extended European Search Report", dated Jun. 16, 2020, 9 pages.
Friedenbach, "[Bitcoin-Development] Compact SPV Proofs Via Block Header Commitment", XP055701256, Available Online at: https://www.mail-archive.com/bitcoin-development@lists.sourceforge.net/msg04318.html, Mar. 17, 2014, 3 pages.
Luu et al., "Flyclient: Super Light Client for Cryptocurrencie", XP055701253, Available Online at: https://sealingbitcoin.org/stanford2017/Day1/flyclientscalingbitcoin.pptx.pdf, Nov. 4, 2017, 41 pages.
Todd, "Python-Proofmarshal/mmr.py At Master. Proofchains/Python-Proofmarshal. Github", Available Online at: https://github.com/proofchains/pythonproofmarshal/blob/master/proofmarshal/mmr.py, Mar. 21, 2015, 12 pages.

* cited by examiner

VERIFICATION OF INTERACTIONS SYSTEM AND METHOD

CROSS REFERENCE TO RELATED APPLICATIONS

This application is the U.S. national stage of PCT/US2018/046101, filed Aug. 9, 2018, which claims priority to U.S. Provisional Application No. 62/543,259 filed Aug. 9, 2017, both of which are herein incorporated by reference in their entirety.

BACKGROUND

To ensure the validity of interactions, verification networks rely on a mechanism to verify if particular interactions are included in a blockchain. A node in the verification network can check if an interaction is recorded in the blockchain and that the block belongs to the longest chain (i.e., correct chain), in case of a fork in the blockchain. To perform these checks, the node downloads all blocks in the blockchain and verifies all of them. Blockchains like Ethereum [Vitalik Buterin. Ethereum's white paper. https://github.com/ethereum/wiki/wiki/White-Paper 2014] and Bitcoin [Satoshi Nakamoto. Bitcoin: A peer-to-peer electronic cash system, 2008. Available at https://bitcoin.org/bitcoin.pdf] rely on proof-of-work (PoW) [Cynthia Dwork and Moni Naor. Pricing via processing or combatting junk mail. In *Advances in Cryptology—CRYPTO '92: 12th Annual International Cryptology Conference* Santa Barbara, California, USA Aug. 16-20, 1992 Proceedings, pages 139-147, Berlin, Heidelberg, 1993. Springer Berlin Heidelberg] to reach agreement on blocks of transactions added to their blockchains. In Bitcoin and Ethereum, syncing all of these blocks requires a node to send and receive hundreds of gigabytes of data (about 160 GB in Bitcoin, see [Blockchain charts: Bitcoin's blockchain size, July 2018. Available at https://blockchain.info/charts/blocks-size], and 650 GB in Ethereum, see [Bitinfocharts: Ethereum blockchain size, July 2018. Available at https://bitinfocharts.com/ethereum]), taking days for both downloading and verification.

Having all blocks allows a node to verify the inclusion of any past transaction on the blockchain. Such a requirement especially imposes a significant burden on resource-limited clients, often known as light or thin clients, such as smartphones and Internet-of-things devices that typically have access to limited bandwidth, storage, and computation resources, but still want to verify the inclusion of transactions on the blockchain.

Bitcoin has a synchronization mechanism, called simplified payment verification (SPV), that allows clients with limited resources, such as mobile phones and tablets, to verify transactions without downloading the entire blocks. In SPV, instead of downloading all blocks from a full node, an SPV client can download all block headers, which have a much smaller size than the blocks (e.g., 80 bytes per block header vs 1 MB per block in Bitcoin), but still contain enough information to correctly verify that a transaction is included in some block and verify that the block is included at a certain position in the blockchain. Each block header contains the root of a Merkle tree, see [Ralph C. Merkle. A digital signature based on a conventional encryption function. In *A Conference on the Theory and Applications of Cryptographic Techniques on Advances in Cryptology*, CRYPTO '87, pages 369-378, London, UK, UK, 1988. Springer-Verlag], that is constructed over all transactions in the block. The Merkle root, along with a Merkle proof sent by the full node for any given transaction, allows the light client to verify the inclusion of the transaction in the block. Due to the hash of the previous block included in each header, the client can also check the validity of every header on the chain one-by-one. This ensures that the header corresponds to a valid block at a certain position in a blockchain of the same length, which the full node has never sent to the light client in full.

SPV clients are the most popular clients in the Bitcoin ecosystem and enable various applications to a broad class of users. This is mainly due to the fact that not many people can afford the technical and physical resources needed to run a full node. For example, Bitcoin's blockchain was recently used to build notary services by allowing users to verify the validity and integrity of documents with SPV clients, see [Open timestamps. https://opentimestamps.org/, 2018] and [Stampery. https://stampery.com/, 2018]. Also, in a recent work known as Catena, see [Alin Tomescu and Srivinas Devadas. Catena: Efficient non-equivocation via bitcoin. In 2017 *IEEE Symposium on Security and Privacy (SP)*, pages 393-409, May 2017], an authenticated log system leverages Bitcoin's blockchain to allow Internet browsers to fetch and validate HTTPS certificates. Thus, light-weight verification clients are in great demand. SPV proofs can also be used in applications that require cross-ledger verification of transactions, e.g., transferring assets to sidechains, see [Dashjr et al, Enabling blockchain innovations with pegged sidechains, 2014. https://www.blockstream.com/sidechains.pdf] and [Kiayias et al, Non-interactive proofs of proof-of-work. 2017], and sharding-based blockchain protocols, see [Luu et al, A secure sharding protocol for open blockchains. In *Proceedings of the* 2016 *ACM SIGSAC Conference on Computer and Communications Security*, CCS '16, pages 17-30, New York, NY, USA, 2016. ACM], [Kokoris-Kogias at al, OmniLedger: A secure, scale-out, decentralized ledger via sharding. In 2018 *IEEE Symposium on Security and Privacy (S&P)*, pages 19-34, 2018], and [Mahdi Zamani, Mahnush Movahedi, and Mariana Raykova. RapidChain: Scaling blockchains via full sharding. In 2018 *ACM Conference on Computer and Communications Security (CCS)*, 2018].

As the number of block headers increases linearly with the size of the blockchain, the resource constraints for current light clients also increase. For example, as of mid-2018, the Ethereum blockchain has more than 6 million blocks, see [Bitinfocharts: Ethereum blockchain size, July 2018. Available at https://bitinfocharts.com/ethereum]. Given that each block header is of size 528 bytes, an SPV client in Ethereum would have to download and store more than 3 GB of data to be able to verify all events on the Ethereum blockchain. As such, current light clients cannot handle the large amounts of data needed to verify interactions on blockchains as the length of the blockchains increase.

Embodiments of the invention address these and other problems individually and collectively.

BRIEF SUMMARY

Embodiments of the invention are directed to methods and systems of efficiently determining that a full node maintains a valid longest blockchain as well as verifying an that interaction is valid and stored in the blockchain.

One embodiment of the invention is directed to a method. The method comprises a client device receiving a verification request comprising an interaction identifier; querying, by the client device, a full node for a random sampling of block headers from the full node; receiving, by the client device, the random sampling of block headers from the full node; verifying, by the client device, the random sampling of block headers; and determining that the blockchain maintained by the full node is valid after verifying the random sampling of block headers.

Another embodiment of the invention is directed to the client device comprising: a processor, a memory; and a computer readable medium coupled to the processor, the computer readable medium comprising code, executable by the processor, for implementing a method comprising: receiving a verification request comprising an interaction identifier; querying a full node for a random sampling of block headers from the full node; receiving the random sampling of block headers from the full node; verifying the random sampling of block headers; and determining that the blockchain maintained by the full node is valid after verifying the random sampling of block headers.

Another embodiment is directed to a method. The method comprising: receiving, by a full node, a query for a random sampling of block headers including a random number from a client device; selecting, by the full node, the random sampling of block headers from a blockchain; determining, by the full node, a plurality of Merkle mountain range proofs associated with the random sampling of block headers; and transmitting, by the full node, the random sampling of block headers and the plurality of Merkle mountain range proofs to the client device.

Another embodiment of the invention is directed to the client device comprising: a processor, a memory; and a computer readable medium coupled to the processor, the computer readable medium comprising code, executable by the processor, for implementing a method comprising: receiving a query for a random sampling of block headers including a random number from a client device; selecting the random sampling of block headers from a blockchain; determining a plurality of Merkle mountain range proofs associated with the random sampling of block headers; and transmitting the random sampling of block headers and the plurality of Merkle mountain range proofs to the client device.

Another embodiment is directed to a method. The method comprising: receiving, by a full node, a query for a random sampling of block headers including a random number from a client device; selecting, by the full node, the random sampling of block headers from a blockchain; determining, by the full node, a plurality of verification proofs associated with the random sampling of block headers; and transmitting, by the full node, the random sampling of block headers and the plurality of verification proofs to the client device, wherein the client device verifies the random sampling of block headers and the plurality of verification proofs.

Another embodiment of the invention is directed to the full node comprising: a processor, a memory; and a computer readable medium coupled to the processor, the computer readable medium comprising code, executable by the processor, for implementing a method comprising: receiving a query for a random sampling of block headers including a random number from a client device; selecting the random sampling of block headers from a blockchain; determining a plurality of verification proofs associated with the random sampling of block headers; and transmitting the random sampling of block headers and the plurality of verification proofs to the client device, wherein the client device verifies the random sampling of block headers and the plurality of verification proofs.

Further details regarding embodiments of the invention can be found in the Detailed Description and the Figures.

DETAILED DESCRIPTION

Figure 1:
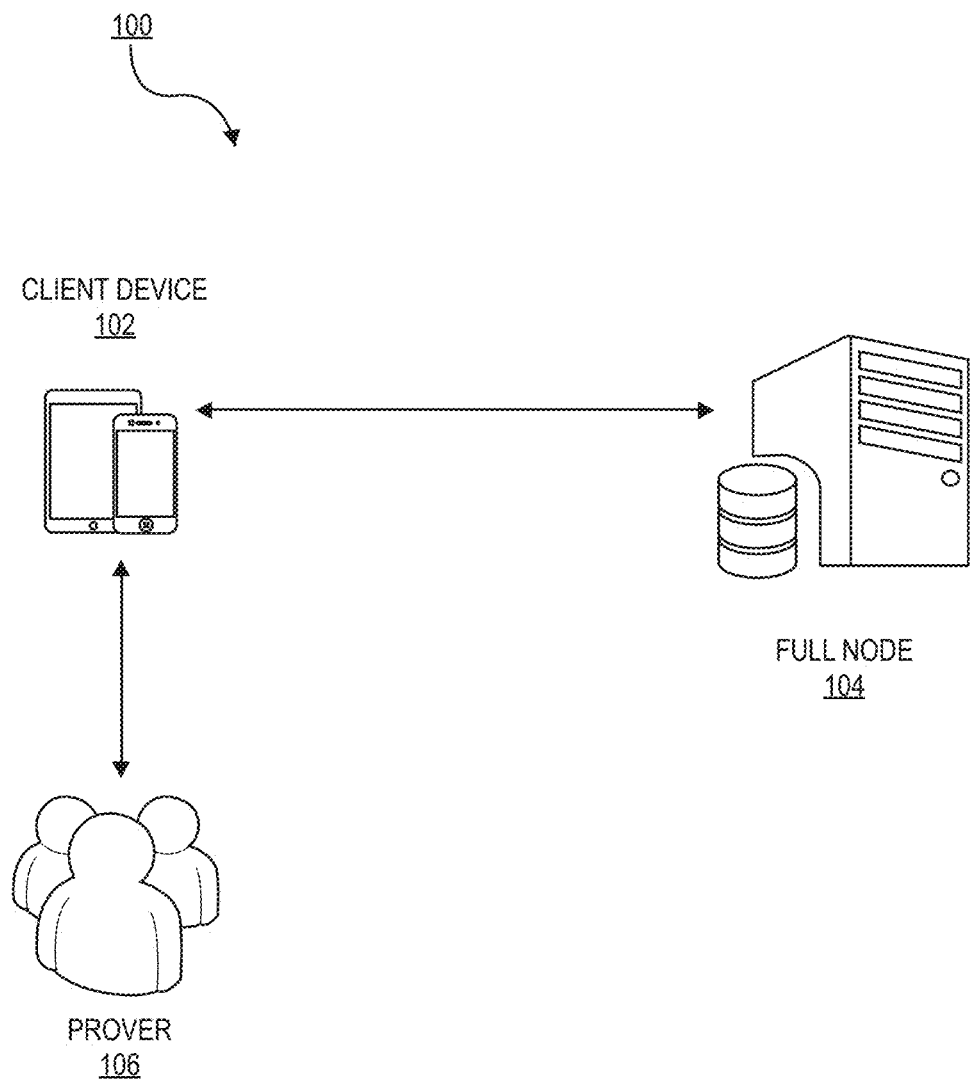
FIG. 1 shows a system according to embodiments of the invention.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "client device" may be a computing device capable of transmitting and/or receiving data. Examples of client devices may include a mobile phone, a smart phone, a personal digital assistant (PDA), a laptop computer, a desktop computer, a server computer, a vehicle such as an automobile, a light client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "light client" may be an application or software capable of communicating with a verification network. The light client may, for example, be present on a client device. In some embodiments, a light client may communicate with a verification network and verify a longest blockchain and an interaction.

A "verification network" may be any set of nodes (computer systems and components) configured to provide verification for an interaction. The verification network may comprise a distributed computing environment utilizing several nodes that are interconnected via communication links, using one or more computer networks or direct connections. The verification network may be implemented over any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the verification network can be enabled by wired or wireless connections and combinations thereof. Nodes may be independently operated by third parties and may be added to, or removed from, the verification network on a continuous basis. In some embodiments, a node in a verification network may be a full node.

A "node" may be a point at which lines or pathways intersect or branch or can be a central or connecting point. A node can be a "graph node," which can be a data value in a Merkle tree or a Merkle mountain range. A graph node can include data such as a hash value, which can be equivalent to child graph nodes of the graph node hashed together. A graph node at the bottom of a Merkle tree or a Merkle mountain range can be referred to as a leaf node. A graph node at the top of a Merkle tree or a Merkle mountain range can be referred to as a root node.

A node can also be a "computer node," which can be any computer or device that connects to the verification network. A node that can fully verify each block and interaction in the blockchain can be a full node. A "full node" can store the full blockchain (i.e., each block and each interaction). A "client device" may be a computer node in the verification network. The use of a node as being a graph node or a computer node will be apparent according to the context in which it is used.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "verification request" can be a request message requesting verification. A verification request can comprise an interaction identifier. A verification request can request verification of an interaction identifier. In some embodiments, the verification request can also comprise a Merkle proof as well as a Merkle mountain range proof. The Merkle proof and the Merkle mountain range proof can be associated with the interaction identifier included in the verification request.

A "verification proof" can be a data item that can be used to verify the truth of a statement. A verification proof can be included in a verification request regarding an interaction. A verification proof can be a Merkle proof or a Merkle mountain range proof.

A "Merkle tree" can be a data structure that can encode interaction data. A Merkle tree can be a balanced binary tree where the leaf nodes of the tree hold some value, and each non-leaf node can store a hash of a concatenation of the values of both children nodes. When a new leaf is added to a Merkle tree, the entire tree can be recomputed. For example, each node in the Merkle tree can be determined to be the hash of both children nodes.

A "Merkle proof" can be a proof that an interaction is included in a Merkle tree. A Merkle proof can include a path from a Merkle root of a Merkle tree to a node associated with an interaction identifier as well as sibling nodes of each node in the path. The path can include each node connecting the Merkle root node to the node associated with the interaction identifier.

A "Merkle mountain range" can be a data structure that can encode block headers. For example, a Merkle mountain range can be a type of Merkle tree. A Merkle mountain range M can be a binary hash tree with n leaves, a root r, and the following properties: 1) M can be a hash tree; 2) M can have a depth $[\log_2 n]$; and 3) if n>1, the number of leaves $n=2^i+j$ for a maximum integer i such that $2^1<n$, wherein r.left can be a Merkle mountain range with $2^i$ leaves and wherein r.right can be a Merkle mountain range with j leaves. A Merkle mountain range can allow for new leafs to be appended to the Merkle mountain range without recomputing the entire Merkle mountain range. A small number of nodes are recomputed when appending a new leaf to a Merkle mountain range.

A "Merkle mountain range proof" can be a proof that a block header is included in a Merkle mountain range. For example, a Merkle mountain range proof can include a path from a Merkle mountain range root to a node associated with a block header. The path can include each node connecting the root node to the node associated with the block header. The Merkle mountain range proof can also include the sibling nodes of each node in the path.

A "sibling node" can denote a relationship between nodes. A node's sibling node can be a node that is in a same hierarchical level under the same parent node in either a Merkle tree or a Merkle mountain range. For example, a node that is a parent node can have two child nodes that are on a lower hierarchical level than the parent node. The two child nodes can be sibling nodes.

A "Merkel root" and a "Merkle mountain range root" can be a node at the highest hierarchical level in a Merkle tree or a Merkle mountain range, respectively. A Merkle root and a Merkle mountain range root do not have any sibling nodes or parent nodes. A Merkle root and a Merkle mountain range root can connect to child nodes.

A "blockchain" can be a distributed database that maintains a continuously-growing list of records secured from tampering and revision. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments of the invention, a blockchain may be distributed, and a copy of the blockchain may be maintained at each full node in a verification network. Any node within the verification network may subsequently use the blockchain to verify interactions.

A "block header" can be a header including information regarding a block. A block header can be used to identify a particular block an a blockchain. A block header can comprise any suitable information, such as a previous hash, a Merkle root, a timestamp, a nonce, and a Merkle mountain range root. In some embodiments, a block header can also include a difficulty value.

An "interaction" may refer to a reciprocal action or influence. An interaction can include a communication, contact, or exchange between parties, devices, and/or entities. Example interactions include a transaction between two parties and a data exchange between two devices. Interactions can also be agreements, contracts, and the like.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "resource provider" may be an entity that can provide a resource such as goods, services, information, and/or access. Examples of resource providers includes merchants, access devices, secure data access points, data providers, transit agencies, governmental entities, venue and dwelling operators, etc. A resource provider may operate a client device. A merchant may typically be an entity that engages in transactions and can sell goods or services, or provide access to goods or services.

A "merchant" may typically be an entity that engages in transactions and can sell goods or services, or provide access to goods or services.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

I. INTRODUCTION

Embodiments of the invention allow for an interaction verification protocol for light clients in blockchain protocols that grow based on the longest chain principle. In embodiments of the invention, a verifier operating a client device can download and store a logarithmic (rather than a linear) number of block headers to verify any interaction stored on a blockchain. Embodiments of the invention can utilize a non-interactive probabilistic protocol to sample a small (e.g., logarithmic) set of random block headers from a full node to limit the likelihood of an adversarial full node cheating in the longest-chain verification process, given the adversary's limited computational power in creating valid blocks. A data structure called a Merkle mountain range (MMR) can allow client devices to verify any interaction in a blockchain with a minimal amount of information. The Merkle mountain range can include a Merkle mountain range root that can be stored in the block headers. Further, embodiments of the invention can be implemented in current Bitcoin and/or Ethereum networks via a soft fork.

Reducing the number of block headers that a client device has to download from a full node is a security challenge. By downloading the entire chain of block headers, the client device can verify that the events proved by the full node are actually recorded on the longest chain. Without being required to send all block headers to the client device, a malicious prover can take advantage of the client device's smaller computational power (relative to the combined computational power of honest nodes) to create and send only a small (but valid) number of fake blocks tricking the client device to accept a smaller fake chain. Existing solutions for handling this challenge are inefficient, complex, and require significant changes to the design of already-established blockchains.

A. Prior Work

Figure 3:
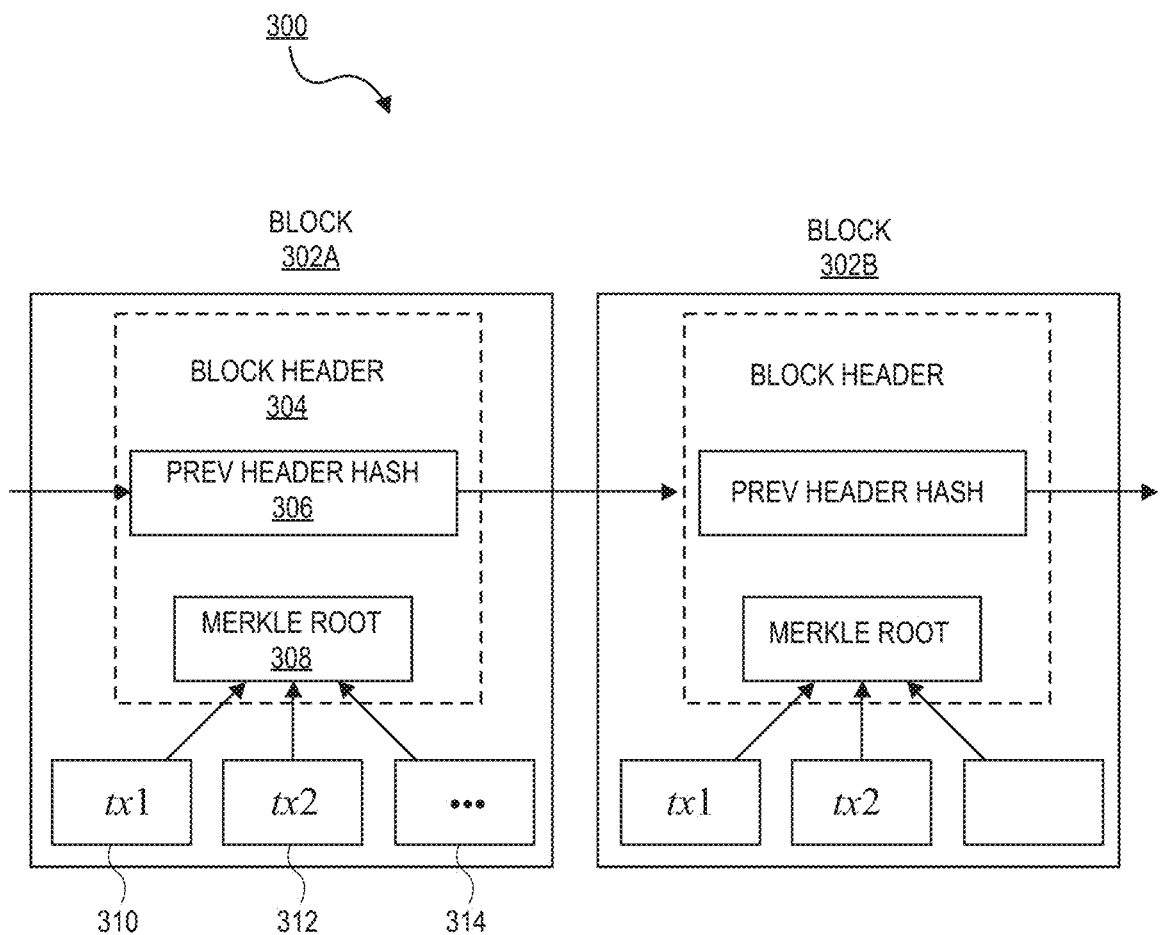
FIG. 3 shows an example blockchain format.

Current blockchain technologies, such as Bitcoin and Ethereum, maintain an append-only ledger in a network. The ledger includes a list of blocks of transaction data, the blocks are cryptographically chained together as depicted in FIG. 3. A block is created by a computationally intensive process called proof-of-work in which valid blocks need to demonstrate a sufficient "difficulty" (i.e., sufficient computation power to create on average). If there are more than one available chains of blocks, then network participants, i.e., nodes, need to download all blocks in all chains and follow the chain which has the highest total difficulty. This mechanism guarantees that, in the long run, the network will agree on a single and valid chain, see [Garay et al, The Bitcoin backbone protocol: Analysis and applications. In *Advances in Cryptology—EUROCRYPT* 2015, pages 281-310, 2015], [Bitcoin Website. http://www.bitcoin.org/], and [Rafael Pass, Lior Seeman, and Abhi Shelat. Analysis of the blockchain protocol in asynchronous networks. In Jean-Sebastien Coron and Jesper Buus Nielsen, editors, *Advances in Cryptology—EUROCRYPT* 2017, pages 643-673, Cham, 2017. Springer International Publishing.].

Nakamoto [Bitcoin Website. http://www.bitcoin.org/] proposes a simplified payment verification (SPV) protocol to verify Bitcoin transactions with minimal trust on some full nodes. Specifically, a client device downloads all block headers rather than the full blocks, which are much smaller in size. A block header contains a hash of a Merkle root that commits all transactions in the block. Therefore, after downloading all block headers in the blockchain, a client device can verify the existence of any transaction in any block, given that a prover provides a Merkle proof of size logs hashes to the client device, in which s is the number of transactions in the block. For further details on light clients in Bitcoin see [socrates1024. The high-value-hash highway. https://bitcointalk.orgfindex.php?topic=98986.0, 2012].

FIG. 3 shows an example blockchain format. For example, the blockchain format shown in FIG. 3 can be used in Bitcoin. A blockchain 300 can comprise a plurality of blocks, for example, block 302A and block 302B. Each block can comprise a block header, e.g., block 302A comprises block header 304. The block header 304 can include multiple data elements, such as a previous header hash 306 and a Merkle root 308. The previous header hash 306 can be a hash of the previous block's header. The Merkle root 308 can be a root of a Merkle tree which is a tree in which every leaf node is labelled with the hash of a data block, for example a transaction 310-314. Each leaf of the Merkle tree can represent one of the transactions 310-314.

There are two additional solutions to SPVs proposed by Kiayias et. al., see [Kiayias et al, *Proofs of Proofs of Work*

*with Sublinear Complexity*, pages 61-78. Springer Berlin Heidelberg, Berlin, Heidelberg, 2016] and [Kiayias et al, Non-interactive proofs of proof-of-work. 2017]). They propose an SPV protocol, called proofs of proof-of-work (PoPoW), which reduces the required resources of an SPV client to a logarithmic number of blocks. The protocol is based on the observation that a certain number of lucky blocks called superblocks are expected to exist in a proof-of-work (PoW) chain if it has been created honestly. A superblock is a rare block that has a PoW output value (i.e., the block ID) containing more leading zeros than the other valid blocks, and hence, can be used to show that enough work has been done when the chain containing that block was created. It can be shown that, by verifying the validity of a logarithmic number of superblocks, a client device can ensure the validity of the entire chain it receives from a full node with high probability. Inspired by a skip list data structure, PoPoW changes the blockchain structure in such a way that each block, instead of having one reference to the immediate previous block, stores multiple references to previous blocks including the superblocks.

However, PoPoW requires significant modifications to the blockchain structure which can limit its adoption in existing blockchains. Moreover, the practicality of the PoPoW approach is yet to be shown, as the constant factors in the protocol's overhead seems to be large. Each transaction inclusion proof in PoPoW is increased by m log(n)log(log(n)) in size to prove that the block that contains the transaction belongs to the correct chain, where m is a security parameter and where n is the number of blocks in the blockchain. Furthermore, PoPoW increases the size of each proof by a log n factor. In addition, PoPoW is interactive, meaning that the client device has to communicate over multiple sequential rounds with the client device to obtain a validity proof. This incurs a high latency and communication cost for both the client device and the full node.

In a later work, Kiayias et. al., see [Kiayias et al, Non-interactive proofs of proof-of-work. 2017], present an attack against PoPoW, where an adversary can double-spend bitcoins even if it controls a minority of the hashing power. They also propose a non-interactive proofs of proof-of-work (NIPoPoW) protocol that allows succinct (i.e., logarithmic-size) proofs but with the same proof complexity as in PoPoW.

However, the PoPoW and NIPoPoW protocols are vulnerable to a bribing attack, where an attacker offers an incentive to miners in the network who will be lucky and find superblocks, in exchange for not publishing their blocks to the network. The attacker then builds a fake chain containing the superblocks of the bribed miner's superblocks and uses it to pretend possession of the longest chain using a valid PoPoW proof. Such an attack is possible in any protocol that differentiates between mined blocks in a deterministic way, because the adversary knows in advance the type of blocks that it is willing to bribe. The adversary can advertise for the superblocks before the superblocks are mined and published to the network. To prove block inclusion, vector commitments can be employed as described in https://eprint.iacr.org/2011/495.pdf.

B. Problem Definition

Consider a blockchain protocol that grows a chain based on the longest (i.e., most difficult) chain rule of PoW-mined blocks (see [Garay et al, The bitcoin backbone protocol: Analysis and applications. In *Annual International Conference on the Theory and Applications of Cryptographic Techniques*, pages 281-310. Springer, 2015]), where honest miners eventually agree on the chain that requires the largest combined mining power to be created. Also, consider an adversary that owns at most a one half fraction of the mining power (e.g., $f<\frac{1}{2}$) in the verification network. As shown in FIG. 1, an SPV protocol can be executed between a prover, a client device (i.e., a verifier), and a group of full nodes. The full nodes can claim to hold a valid copy of the blockchain. An adversarial full node may store a non-valid copy of the blockchain. The prover wants to convince the client device that a previously performed interaction is valid and has already been recorded on the blockchain. Embodiments of the invention allow the client device to verify the validity of the interaction with the help of the full nodes. Less than half of the full nodes may be controlled by the adversary, and thus collude with a malicious prover. An interaction is said to be valid if it is included in a correctly-mined block of interactions that belongs to the longest chain.

Embodiments of the invention can provide for the following security, client efficiency, and non-interactiveness properties. The security property means that the client device can accept an interaction if the interaction is valid (i.e., is an interaction included in a correctly-mined block that belongs to the longest chain with high probability). The client efficiency property means that the client can download and verify a small (e.g., sublinear) number of block headers from a full node, rather than download all block headers in the blockchain. The non-interactiveness property means that no subsequent interactions between the prover, the client, and the full nodes are needed.

To achieve the first property of security, the client device can participate in the process with the prover as well as the full nodes to obtain a proof, denoted by $\pi_{tx}$, that provides the following guarantees: 1) proof of inclusion: the interaction is included in some correctly-mined block B on a chain C; and 2) proof of chain: C is the longest (e.g., most difficult) chain agreed upon by a majority of the nodes in the verification network.

Given that the adversary that can control at most an f fraction of the mining power, the proof $\pi_{tx}$ can provide the following properties: 1) completeness: at the end of the process, the client device can determine that the interaction is valid and 2) soundness: the adversary cannot convince the client device that the interaction is valid.

C. Overview of Embodiments of the Invention

Embodiments of the invention allow for a non-interactive SPV protocol for a client device. In embodiments of the invention, a client device can download and store a logarithmic number of blocks using a probabilistic verification method as well as using a structure called Merkle mountain range (MMR), see [Peter Todd. Merkle mountain range. https://github.com/opentimestamps/opentimestamps-server/blob/master/doc/merkle-mountain-range.md]. An MMR allows small inclusion proofs, while including an additive logarithmic factor in addition to the current inclusion proof in Bitcoin and Ethereum. Embodiments of the invention use an extra hash (i.e., the MMR root) in the block headers which can be added to existing blockchains (e.g., Bitcoin) via a soft-fork.

Theorem 1: there exists a protocol that can provide the completeness and soundness properties, described above, with high probability as well as the following performance guarantees: 1) let n denote the number of blocks in the longest chain, and s denote the number of interactions in the block B. $\pi_{rec(tx)}$ has size O(log s) and $\pi_B$ has size O(log n).

2) The client device can verify $\pi_{tx}$ efficiently with an O (log s+log n) computation overhead.

Consider a prover (i.e., a full node) that wants to convince a verifier (i.e., a client device) that an interaction tx is recorded properly in some block $B_x$ on a blockchain of length n, where $x \in [1,n]$. To achieve this, the prover can provide the client device with a proof of inclusion which consists of two cryptographic proofs. The proof of inclusion can include a proof of longest chain and a proof of interaction. The proof of longest chain can be that the block $B_x$ is located at height x of the correct (i.e., longest) chain. The proof of interaction can be that the interaction tx is recorded properly in the block $B_x$. The client device can verify that the interaction is included in a block as well as verify that the block is in the longest chain.

To commit to the entire chain of blocks, the prover can maintain a Merkle mountain range over all blocks added to the blockchain so far. In addition to being a Merkle tree, MMR allows for efficient appends at the prover side and efficient block inclusion verifications at the verifier side. At every block height i, the full node appends the hash of $B_{i-1}$ to the most recent MMR and records the new MMR root, denoted by $M_{i-1}$, in the header of $B_i$ (see FIG. 5). As a result, each MMR root stored at every block height can be seen as a commitment by the full node to the blockchain at that specific height.

An MMR tree can allow the client device to efficiently verify any blockchain event (i.e., an interaction) with the latest block header. MMR allows all previous blocks to be efficiently committed to the latest block header in a single hash. The original Merkle tree structure can be used to achieve the same goal, however, updating the Merkle trees with new block headers as the leaves is not efficient. The entire Merkle tree either needs to be restructured, which is inefficient, or the system can use an "unbalanced" tree which may yield a proof size of much larger than log n hashes. MMR is a variant of the original Merkle tree that allows a much more efficient update process, thus the overhead for full nodes when processing blocks becomes negligible. Further, introducing MMR into current blockchain protocols only needs a mild modification.

Given any two blockchains of the same length, one of which is maintained by an adversary with less than one half fraction (i.e., $f<\frac{1}{2}$) of mining power, embodiments of the invention allow client devices to determine, with high probability, which chain is valid and longer by downloading a small (i.e., log n) number of block headers from each chain. In embodiments of the invention, this can be done using a novel probabilistic verification protocol in which O(log n) block headers are downloaded by the client device from each chain and verified. Here the concept of length is used to mean the number of blocks, for ease of explanation. Below the problem can be formulated to include the concept of total difficulty, to match with the actual implementation in Bitcoin and Ethereum.

Next, two phases will be discussed. The first phase can be prove, while the second phase is verify. The prove phase can be an interactive protocol performed between the prover and the verifier over O(log n) rounds to submit the proof of inclusion to the verifier for a given interaction tx. In some embodiments, the prove phase can be a non-interactive protocol to minimize latency, which is described in further detail herein. The verify phase can be executed locally by the verifier and does not require any interaction between the prover and the verifier.

To generate a proof of longest chain, the two parties (i.e., the full node and the verifier) can participate in m=O(log n) rounds of a probabilistic block sampling protocol. In each round $j \in [1,m]$, the verifier can send a random number $r_j$ to the full node to request k random blocks from a certain part of the full node's header chain. In some embodiments, the k random blocks can be k=O(1), in other words, k can be a constant number of blocks sampled in each round. The k random blocks can be determined based on the random number $r_j$. For example, if the random number is equal to a value of 001002008010, then the full node can select the four block headers of blocks 1, 2, 8, and 10. As another example, the random number $r_j$ can be equal to a value of 3469. The full node can select the blocks 3, 4, 6, and 9 based on the random number $r_j$. The random number $r_j$ can be in any suitable format. In other embodiments, the full node can use the random value as an input to a function. The full node can then select a number of random block headers based on the output of the function.

If any of the k blocks are invalid, then the client device can abort the process and blacklist the full node. In some embodiments, the client device can verify that it received the correct block headers based on the random number $r_j$, for example, block headers 3, 4, 6, and 9 when the random number $r_j$ is 3469. Otherwise, the client device can proceed to the next round of requests. In round j, the full node can split its chain to $2^{j-1}$ equal-sized partitions. The full node can sample k headers from the last partition, i.e., from the header at height $$n - \frac{n}{2^{j-1}}$$

to the header at height n. For example, if it is the second round, j=2, and the current height of the blockchain is n=100, then the full node can partition the blockchain into $2^{2-1}=2$ partitions. The full node can sample k headers from the most recent partition, i.e., the second partition, ranging from the height $$100 - \frac{100}{2^{2-1}} = 50$$

the header at height n=100.

The benefit of sampling random block headers from increasingly small partitions of the blockchain, allow the client device to determine that the full node is not controlled by an adversary. As the partitions decrease in size, the full node selects random block headers that are more recent. In this way, the client device, upon receiving the random block headers, can verify more recent block headers than old block headers, thus preventing adversaries from creating small falsified sidechains (e.g., at a forking point in the blockchain).

To verify each block header, the client device can receive an MMR proof from the full node and can then verify the proof using the latest MMR root, $M_{n-1}$, recorded in the header of the last block, $B_n$. To obtain the last proof (i.e., that the block has been included in the longest chain), the client device can verify an MMR proof which can be obtained from the last block header of the longest chain (which is already proved). To obtain a proof that the interaction was included in some block, the client device can verify the Merkle proof provided by the full node against the root of the interaction Merkle tree included the block header. This is described in further detail below.

The intuition behind the probabilistic verification protocol is that given any two blockchains of the same length, one of which is maintained by an adversary with $f<\frac{1}{2}$ fraction of the honest mining power, the probability that the adversary can mine the same number of blocks as the honest miners reduces exponentially as the valid chain grows. Thus, if the adversary has mined a certain number of valid blocks in any partition and both chains have equal lengths, the adversary must include a sufficient number of fake blocks to "lengthen" the malicious chain.

Additionally, in some embodiments, a Fiat-Shamir heuristic [Amos Fiat and Adi Shamir. How to prove yourself: Practical solutions to identification and signature problems. In *Conference on the Theory and Application of Cryptographic Techniques*, pages 186-194. Springer, 1986.] using the random oracle assumption can make the probabilistic verification protocol non-interactive. In the non-interactive protocol, the client device no longer sends a random number in every round for the sampling of k block headers, yet it is computationally intractable for the adversary to cheat the client device. The non-interactiveness makes the process more practical since (1) the full nodes can send the same proof to many client devices without any recalculation; and (2) the client device can forward the proof to other new client devices, which can safely verify the correctness of the proof. This reduces both the computation and bandwidth overheads for client devices and full nodes.

The valid chain is the chain that requires more work to find, e.g., the highest total block difficulty. The longest chain rule is a simplified way of determining which chain is valid. In what follows, for ease of explanation, it can be assumed that each block has the same difficulty. However, it is understood that, in some embodiments, each block can have a different difficulty.

D. System

FIG. 1 shows a system 100 comprising a number of components. The system 100 comprises a client device 102, a full node 104, and a prover 106. The client device 102 can be in operative communication with the full node 104 and the prover 106. In some embodiments, the client device 102 can be in operative communication with any suitable number of full nodes, for example, 1, 2, 10, or 100 full nodes. However, for simplicity of illustration, a certain number of components are shown in FIG. 1. It is understood, however, that embodiments of the invention may include more than one of each component.

The components in FIG. 1 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The client device 102 can be a device capable of communicating with a verification network. In some embodiments, the client device 102 may be operated by a resource provider, and the client device 102 may be a verifier. The client device 102 may also be capable of receiving a verification request comprising an interaction identifier from a prover 106. The client device 102 can also determine a full node 104 that holds the longest blockchain, and can verify that the interaction identifier is in a valid block in the longest blockchain using information, such as an MMR root in the latest block header, from the full node. The client device 102 can also verify that an interaction associated with the interaction identifier is valid, and can transmit a verification response to the prover 106 regarding the validity of the interaction.

The client device 102 can then perform additional processing based on the interaction. Additional processing can include performing an action or operation as indicated in the interaction and/or transferring assets, physical and digital, between the verifier and the prover as outlined in the interaction. For example, the interaction can be a transaction between a resource provider and a customer. The interaction can indicate that the customer transferred assets, physical or digital, to the resource prover. Upon verifying the interaction, as described herein, the resource prover can provide a resource, as described in the interaction, to the customer.

Any computer or device that connects to the verification network can be referred to as a node. A node that can fully verify each block and interaction in the blockchain can be a full node. The full node 104 can store the full blockchain (i.e., each block and each interaction) in a memory, and can be capable of proving that it holds the longest blockchain. The full node 104 can also receive queries for a current height of the blockchain and subsequently determine and return the current height of the blockchain. In some embodiments, the full node 104 can be capable of partitioning the blockchain into a number of partitions and can select random block headers from a particular partition.

In some embodiments, the prover 106 can be a client device operated by a user. It could be, but need not be, a full node in some embodiments. The prover 106 may transmit a verification request regarding a previously performed interaction that was stored on the blockchain to the client device 102. As an example, the prover 106 can be a user or customer that wants to provide an interaction identifier associated with a valid interaction to a resource provider operating a client device 102 in order to prove that the interaction occurred and is valid.

Figure 2:
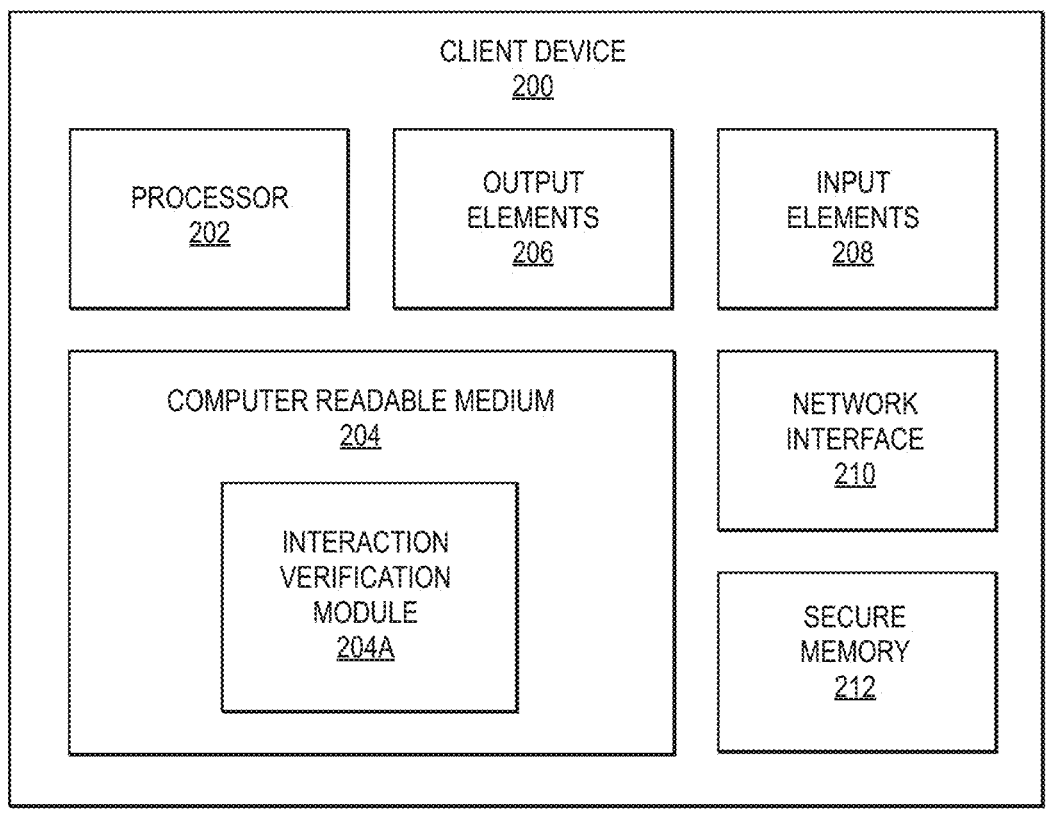
FIG. 2 shows components of a client device according to an embodiment of the invention.

FIG. 2 shows a block diagram of a client device 200 according to some embodiments of the invention. The exemplary client device 200 may comprise a processor 202. The processor 202 may be coupled to a non-transitory computer readable medium 204 comprising an interaction verification module 204A, a one or more output elements 206, one or more input elements 208, a network interface 210, and a secure memory 212.

The computer readable medium 204 may comprise code, executable by the processor 202, to implement a method comprising: receiving a verification request comprising an interaction identifier; querying a full node for a random sampling of block headers from the full node; receiving the random sampling of block headers from the full node; verifying the random sampling of block headers; and determining that the blockchain maintained by the full node is valid after verifying the random sampling of block headers.

The interaction verification module 204A may comprise software code for verifying an Interaction. It may comprise software code executable by the processor 202, to implement a method comprising: verifying a Merkle proof received from a prover; verifying a Merkle mountain range proof received from a prover; determining if an interaction identifier corresponds to a valid interaction based on verification of the Merkle proof and the Merkle mountain range proof; and transmitting a verification response indicating whether or not the interaction identifier corresponds to the valid interaction.

The one or more output elements 206 may comprise any suitable device(s) that may output data. Examples of output elements 206 may include display screens, speakers, and data transmission devices.

The one or more input elements 208 may include any suitable device(s) capable of inputting data into the client device 200. Examples of input devices include buttons, touchscreens, touch pads, microphones, etc.

The network interface 210 may include an interface that can allow the client device 200 to communicate with external computers. The network interface 210 may enable the client device 200 to communicate data to and from another device (e.g., resource provider computer, authorization computer, etc.). Some examples of the network interface 210 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 210 may include Wi-Fi™.

Data transferred via the network interface 210 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 210 and other devices via a communications path or channel. As noted above, any suitable communication path or channel may be used such as, for Instance, a wire or cable, fiber optics, a telephone line, a cellular link, a radio frequency (RF) link, a WAN or LAN network, the Internet, or any other suitable medium.

The secure memory 212 may store encrypted access data, key identifiers, public keys, and any other relevant data securely. The secure memory 212 may be in the form of a secure element, a hardware security module, or any other suitable form of secure data storage. In some embodiments, the client device 200 can store information regarding a genesis block (i.e., the first block in a blockchain).

E. Threat Model

An adversary may be present in the verification network according to embodiments of the invention. The adversary may be an adaptive (or rushing) adversary. As such, the adversary can choose which full nodes in a verification network to corrupt and which blocks to falsify in the blockchain. The mining power of the adversary can be bounded by a known fraction, e.g., $f(0<f<\frac{1}{2})$.

In some embodiments, it can be assumed that the client device is connected to at least one full node which has the correct view of the blockchain. This assumption is equivalent to assuming that the client device is not vulnerable to eclipse attacks. Defending against such attacks is orthogonal of this work and has been done by recent papers, see [Heilman et al, Eclipse attacks on bitcoin's peer-topeer network. In 24*th USENIX Security Symposium* (*USENIX Security* 15), pages 129-144, Washington, D.C., 2015. USENIX Association] and [Gervais et al, Tampering with the delivery of blocks and transactions in bitcoin. In *Proceedings of the 22Nd ACM SIGSAC Conference on Computer and Communications Security*, CCS '15, pages 692-705, New York, NY, USA, 2015. ACM.]. In some embodiments, it can be assumed that the adversary cannot drop or tamper with messages transmitted between the client device and full nodes. The client device is not assumed to know any state in the chain, except the genesis block (i.e., the first block).

II. MERKLE MOUNTAIN RANGE

A data structure called a Merkle mountain range (MMR) can be leveraged to allow a client device to verify any previous interaction using the latest block header. Merkle trees and Merkle mountain ranges will be discussed next.

The need to download all block headers in prior work is, in part, due to the verifications of interactions or events in all previous blocks. After the longest chain has been verified and accepted, with a few block headers downloaded, verification of an interaction in some previous block may include verifying that the block actually belongs to the longest chain. The naive approach is to download all intermediate block headers from the block containing the interaction to the latest block, which inherently requires downloading a linear number of block headers from the chain. However, embodiments of the invention improve upon this by allowing for the verification of any interaction (i.e., obtain a proof $\pi_{rec(tx)}$) in the blockchain using the latest block header of the latest block in the blockchain.

In a first solution to achieving this, a global Merkle tree can be built on all interactions in the blockchain, i.e., every interaction is included in the global Merkle tree. The global Merkle tree can be updated after every new block is added to the blockchain. However, such a solution requires miners to maintain all interactions on the blockchain, which the miners often do not do for performance reasons. This block verification also requires full nodes to obtain all interactions and for the full nodes to reconstruct the Merkle tree from scratch to keep the tree balanced.

A Merkle tree can be a balanced binary tree where the leaves of the tree hold some value, and each non-leaf node stores a hash of a concatenation of the values of both children. In Bitcoin and Ethereum, Merkle trees are used to store transaction hashes of a particular block as the leaves, so the root of the tree is a commitment of all interactions in that block. The root is then stored in the header of the block. An SPV proof of an interaction is then the Merkle proof that the hash of the interaction is a leaf in the Merkle tree. Merkle trees and the security of a Merkle proof is discussed as this will extend to a Merkle mountain range. An MMR allows all previous blocks to be efficiently committed to the latest block header in a single hash. MMR is a variant of the original Merkle tree that allows a much more efficient update process, thus the overhead for full nodes when processing blocks becomes negligible. Further, introducing MMR only requires a mild modification to the current Bitcoin and Ethereum protocol.

A Merkle tree can be defined as a balanced binary tree where the leaves have some value, and each non-leaf node holds the value H(left child∥right child), where H is a collision-resistant hash function. A balanced binary tree means a tree with n leaves has a depth of $O(\log_2 n)$.

Given a Merkle tree MT, with a root r, a Merkle proof that k is a node in the Merkle tree MT can be $\Pi_{k \in MT}$. The Merkle proof $\Pi_{k \in MT}$ is a path from the root r to the node k and the siblings of each node in the path. Since the Merkle tree MT has a depth of O(log n), the proof has size O(log n).

A prover verifier model, is defined below, where a verifier knows the root of a Merkle tree and the prover wants to prove to the verifier that a particular node exists in the tree. First, the verifier has access to a root r of some Merkle tree MT. The prover has access to the Merkle tree MT and can send a Merkle proof path of some k e MT=$\Pi_{k \in MT}$ to the verifier. The verifier can check that the root r is the first value in the proof (i.e. that the verifier was given a proof for the Merkle tree MT), and that the hash of the two nodes at each level in the path (i.e., the hash of a node in the path with the node's sibling node) equals the value of one of the nodes of the previous level. If the Merkle proof is verified to be valid, the verifier can accept the proof, otherwise the verifier can reject the proof.

Theorem 2. Given a Merkle tree MT, a polynomial-time adversary cannot produce a valid Merkle proof $\Pi_{k \in MT}$, for a node k not in the Merkle tree MT. A valid Merkle proof means that an honest verifier will accept it. This can be referred to as the soundness of Merkle proofs. As a proof, assume that the adversary can produce a valid Merkle proof $\Pi_{k \in MT}$. Let r be the root of Merkle tree MT, the Merkle proof $\Pi_{k \in MT}$ starts with the root r, if it does not, the verifier can reject the Merkle proof. Since k∉MT (i.e., the node k is not in the Merkle tree MT), the path the adversary gives must have some initial depth i at which the path differs from any true path in the Merkle tree MT.

Let $p_i'$ be a node in a path at level i and $s_i'$ be its sibling, and let $p_i$ and $s_i$ be the true nodes in the path in in the Merkle tree MT where $x=p_i \| s_i$ or $x=s_i \| p_i$ such that $H(x)=p_{i-1}$. In order for the verifier to accept the Merkle proof $\Pi_{k \in MT}$, x' must equal $p_i' \| s_i'$ or $s_i' \| p_i'$ such that $p_{i-1}=H(x')$. Since the sets $\{p_i, s_i\}$ and $\{p_i', s_i'\}$ differ by at least one value as stated above, x≠x', therefore the adversary found a collision of $H(\perp)$.

Theorem 3. Given a Merkle tree MT, and a node k∈MT, a polynomial-time adversary cannot generate a Merkle proof $\Pi_{k \in MT}$ that is not a true path in the Merkle tree MT. This is referred to as the completeness of Merkle proofs. As a proof, similar to the proof of soundness above, if there is some point in the path differentiates from a true path in the Merkle tree MT, in order for it to be valid, the adversary must have found a hash collision.

A more efficient solution leverages the recently introduced data structure called a Merkle mountain range (MMR), see [Peter Todd. Merkle mountain range. https://github.com/opentimestamps/opentimestamps-server/blob/master/doc/merkle-mountain-range.md], to commit to all previous block headers in the latest block. Having this commitment allows a client device to efficiently verify if a previous block belongs to the longest chain based on the latest block header of the blockchain. Thus, the full node can prove that an interaction was included in the longest chain by providing an MMR proof (to prove that a block belongs to the longest chain), in addition to the current Merkle proof (which shows that the interaction is included in said block). Next, an explanation of how MMR works and why it is better than a standard Merkle tree will be discussed.

MMR is a variant of a Merkle tree that allows for efficient appending of new data entries. MMR allows for the tree to be reasonably balanced even when new data entries are appended dynamically without rebuilding the entire tree from scratch. Specifically, MMR appends a new data entry by modifying a few nodes of the existing tree and still bounds the Merkle proof's length for any data entry sitting on a leaf by log n, wherein n is the number of leaves in the tree.

A Merkle mountain range M, can be defined as a binary hash tree with n leaves, a root r, and the following properties: 1) M is a hash tree; 2) M has depth $\lceil \log_2 n \rceil$; and 3) if n>1, let $n=2^i+j$ for the maximum integer i such that $2^i<n$, wherein r.left is an MMR with $2^i$ leaves and wherein r.right is an MMR with j leaves. The Merkle mountain range M is a balanced binary hash tree, i.e., M is a Merkle tree. Therefore, for all nodes k∈M,∃$\Pi_{k \in MT}$.

Appending new nodes to an MMR will now be discussed. Theorem 4. Given an MMR M, with root r and n leaves, a function AppendLeaf(r,x) can return an MMR M', with n+1 leaves (the n leaves of M plus a new leaf x added as the right-most leaf). An induction proof, following, includes a base case of n=1 and an induction step. In the base case (n=1), M is a single node r with depth 0. r.children=0, so the function AppendLeaf can return a new node with left=r and right=x, and value=H(x∥r). This is a balanced binary hash tree with 2 leaves and depth $1=\log_2 2$ In the induction step, assume the theorem holds for all M with <n leaves. Let M be an MMR with n leaves and root r, AppendLeaf(r,x) will return the following:

i) if $n=2^i$ for some i∈ℕ, AppendLeaf returns a new node r', with left=r, right=x, and value=H(r∥x). M' is the new tree with the three properties of an MMR. The three properties being: 1) since M is a hash tree, M' is also a hash tree; 2) Since the depth of $M=\log_2 n$, the depth of $M'=\log_2 n+1=\lceil \log_2(n+1) \rceil$; and 3) $n'=2^i+1$, r'.left=M=an MMR with $n'=2^i$ leaves, and r'.right=x=an MMR with 1 leaf. The leaves of M' are the leaves of M plus x added as the new right-most leaf.

ii) Otherwise, ∃i,j∈ℕ such that $n=\max_i 2^i+j$, AppendLeaf returns r with r.left the same, and r.right=AppendLeaf (r.right,x), and value=H(r.left∥r.right). M' is the new tree with the following MMR conditions satisfied. (1 and 3) r'.left is an MMR by definition with $2^i$ leaves, r'.right is an MMR by the induction hypothesis with j+1 leaves, thus M' is a hash tree. (2) M has depth $\log_2 2^i=i \geq j$, thus M' has depth $i+1=\lceil \log_2(n+1) \rceil$. The leaves of M' are the leaves of r'.left=r.left, then the leaves of r'.right which by the induction hypothesis will be the original leaves of r.right plus x on the right-most side.

Protocol 1, below, shows an example AppendLeaf(r,x) function that can append a new data entry (i.e., x) to an existing MMR (i.e., r). Protocol 1—AppendLeaf(MMR root r,new leaf node x):

```
1:    if r.children = = a power of 2 then
2:        root = Node
3:        return root
4:    else
5:        r.right = AppendLeaf(r.right,x)
6:        r.value = H(r.left∥r.right)
7:        r.children + +
8:        return r
9:    end if
```

Figure 4:
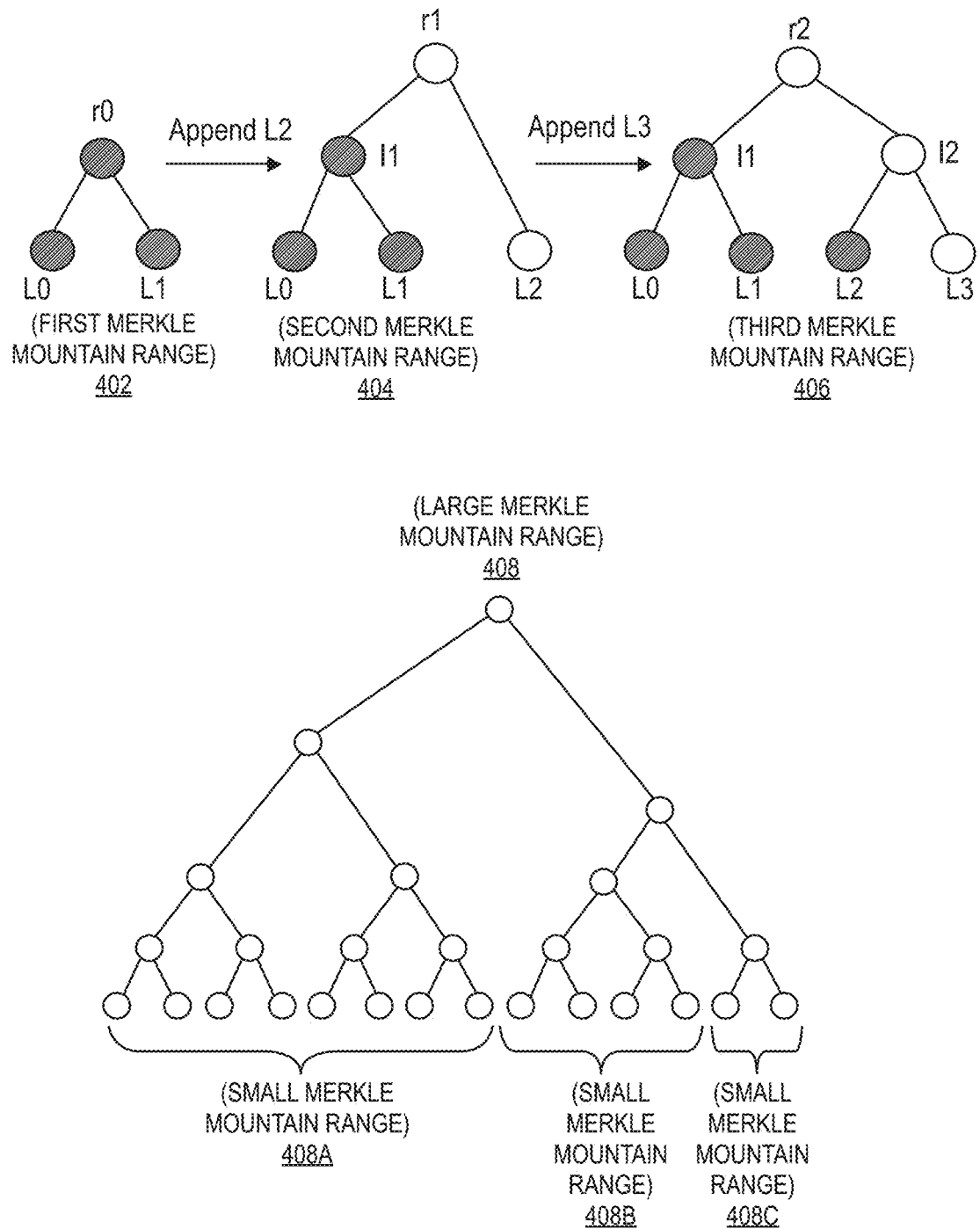
FIG. 4 shows an example of updating a Merkle mountain range when new data entries are appended as new leaves of the Merkle mountain range according to embodiments of the invention.

FIG. 4 shows an example of updating a MMR tree when new data entries are appended as new leaves of the tree. FIG. 4 includes a first Merkle mountain range 402, a second Merkle mountain range 404. and a third Merkle mountain range 406. The white nodes can be either new nodes or nodes that are changed due to a new data entry, such as a new block header being appended as described herein. The black nodes can be nodes that are not changed. MMR guarantees that for every update, log n nodes are either created or modified.

The first Merkle mountain range 402 includes a first Merkle mountain range root r0, a first block header L0, and a second block header L1. The first block header L0 and the second block header L1 can be hashed together to determine the first Merkle mountain range root r0.

A third block header L2, corresponding to a new, third block that is added to the blockchain, can be appended to the Merkle mountain range. Specifically, the third block header L2 is appended to the first Merkle mountain range 402 resulting in the second Merkle mountain range 404. The second Merkle mountain range 404 can include the first block header L0, the second block header L1, and the third block header L2. The first block header L0 and the second block header L1 are not altered when appending the third block header L2. Due to this, the hash of the first block header L0 and the second block header L1 is the same in the first Merkle mountain range 402 and the second Merkle mountain range 404. The first block header L0 and the second block header L1 can be hashed together, resulting in an intermediate value (that can be equivalent to the first Merkle mountain range root r0). The intermediate value and the third block header L2 can be hashed together, resulting in the second Merkle mountain range root r1.

A fourth block header L3, corresponding to a new, fourth block that is added to the blockchain, can be appended to the Merkle mountain range. Specifically, the fourth block header L3 can be appended to the second Merkle mountain range 404, resulting in the third Merkle mountain range 406. The third Merkle mountain range 406 can include the first block header L0, the second block header L1, the third block header L2, and the fourth block header L3. The first block header L0, the second block header L1, and the third block header L2 are not altered when appending the fourth block header L3. Due to this, the hash of the first block header L0 and the second block header L1 is the same in the first Merkle mountain range 402, the second Merkle mountain range 404, and the third Merkle mountain range 406. The first block header L0 and the second block header L1 can be hashed together, resulting in a first intermediate value (that can be equivalent to the first Merkle mountain range root r0). Similarly, the third block header L2 and the fourth block header L3 can be hashed together, resulting in a second intermediate value. The first intermediate value and the second intermediate value can be hashed together, resulting in the third Merkle mountain range root r2. Any suitable number of block headers can be appended to the Merkle mountain range in this manner.

FIG. 4 also includes a larger Merkle mountain range 408. The larger Merkle mountain range 408 can be created as new block headers are appended to the third Merkle mountain range 406. The larger Merkle mountain range 408 can be viewed as comprising three smaller Merkle mountain ranges 408A, 408B, and 408C. As an example, the next block header that is appended to the larger Merkle mountain range 408 can be appended to the smaller Merkle mountain range 408C. The three nodes in 408C can be appended similar to how the first third block header L2 is appended to the first Merkle mountain range 402 resulting in the second Merkle mountain range 404.

A set of MMRs can be defined as $M=\{M_1, M_2, \ldots, M_n\}$ created from some list $[x_1, x_2, \ldots, x_n]$, where $M_1$ is a single node with value $x_1$ and $r_i$ is the root node of an i leaf MMR, $M_i=\text{AppendLeaf}(r_{i-1},x_i)$. A feature of the way MMRs are constructed is that, assuming all $x_i$'s are unique, each $M_i$ has a unique root (otherwise there would be a hash collision), and given the Merkle proof that some $x_k$ is in $M_n$ for k≤n, $\Pi_{x_k \in M_n}$, a verifier can regenerate $r_k$ and that $M_k$ is an ancestor of $M_n$ (i.e., $M_n$ was created from n–k appends to $M_k$).

This can be proved in the following theorem. Theorem 5. For k≤n, given an MMR proof $\Pi_{x_k \in M_n}$, i.e., the MMR proof that leaf $x_k$ is in $M_n$, a verifier can regenerate $r_k$, the root of $M_k$. An induction proof, following, includes a base case of n=1 and an induction step. In the base case (n=1), $M_1$=Node $(x_1)$, $\Pi_{x_k \in M_n}=[r_1]$. In the induction step, assume the theorem holds for all $M_m$, m<n and k≤m. Given $M_n$, any k and $\Pi_{k \in M_n}=[r_n, r_n.\text{left}, r_n.\text{right}, \ldots]$, if k=n then $r_k=r_n$. Otherwise, let i be the maximum integer such that $n=2^i+j$ where j>0. There can be three possibilities: 1) $k=2^i$, $r_k=r_n.\text{left}$; 2) $k<2^i$, thus $x_k$ is in the left subtree of $M_n$. Let $n'=2^i$ and $r_{n'}=r_n.\text{left}$, we get that $\Pi_{x_k \in M_{n'}}=\Pi_{x_k \in M_n}-[r_n, r_n.\text{right}]$. Since n'<n, by the induction hypothesis we can get $r_k$ from $\Pi_{x_k \in M_{n'}}$. 3) $k>2^i$, thus $x_k$ is in the right subtree of $M_n$. Since k<n and i is the maximum integer such that $n=2^i+j$ for some j>0, i is also the maximum integer such that $k=2^i+j'$ for some j'>0. Thus $r_k.\text{left}=r_n.\text{left}$. Note $r_n.\text{right}$ is the MMR $M_j$ where k is the $k'=k-2^i=j'$'th leaf. Thus, $r_k.\text{right}=M_{k'}$ and $\Pi_{x_k \in M_j}=\Pi_{x_k \in M_n}-[r_n, r_n.\text{left}]$. By the induction hypothesis $r_{k'}$ can be extracted from $\Pi_{x_k \in M_j}$. The verifier can hash the left and right roots to get the value of $r_k$.

Unlike classical Merkle trees, MMR's additionally give the ability to prove that an MMR is the previous version of another MMR with a short proof. That is, given the k-th MMR and the nth MMR, a prover can give a proof of size O(log(n)) that convinces a verifier of this fact while the verifier's state is k,n and the root of the k-th and n-th MMRs. This property is formalized below in Lemma 1.

Lemma 1 (MMR inclusion proof). Given a list of n MMRs which are consecutively built based on a list of n numbers, one can prove that any k-MMR (0≤k≤n) is a precedent of the n-MMR with a proof of size O(log n).

A new block header, according to embodiments of the invention, can contain a data field for an MMR root, or the root of the MMR tree that commits the headers of all previous blocks. A full node, upon receiving a new block, can conduct one additional check on the validity of the MMR root. This entails a negligible overhead on the full node.

Figure 5:
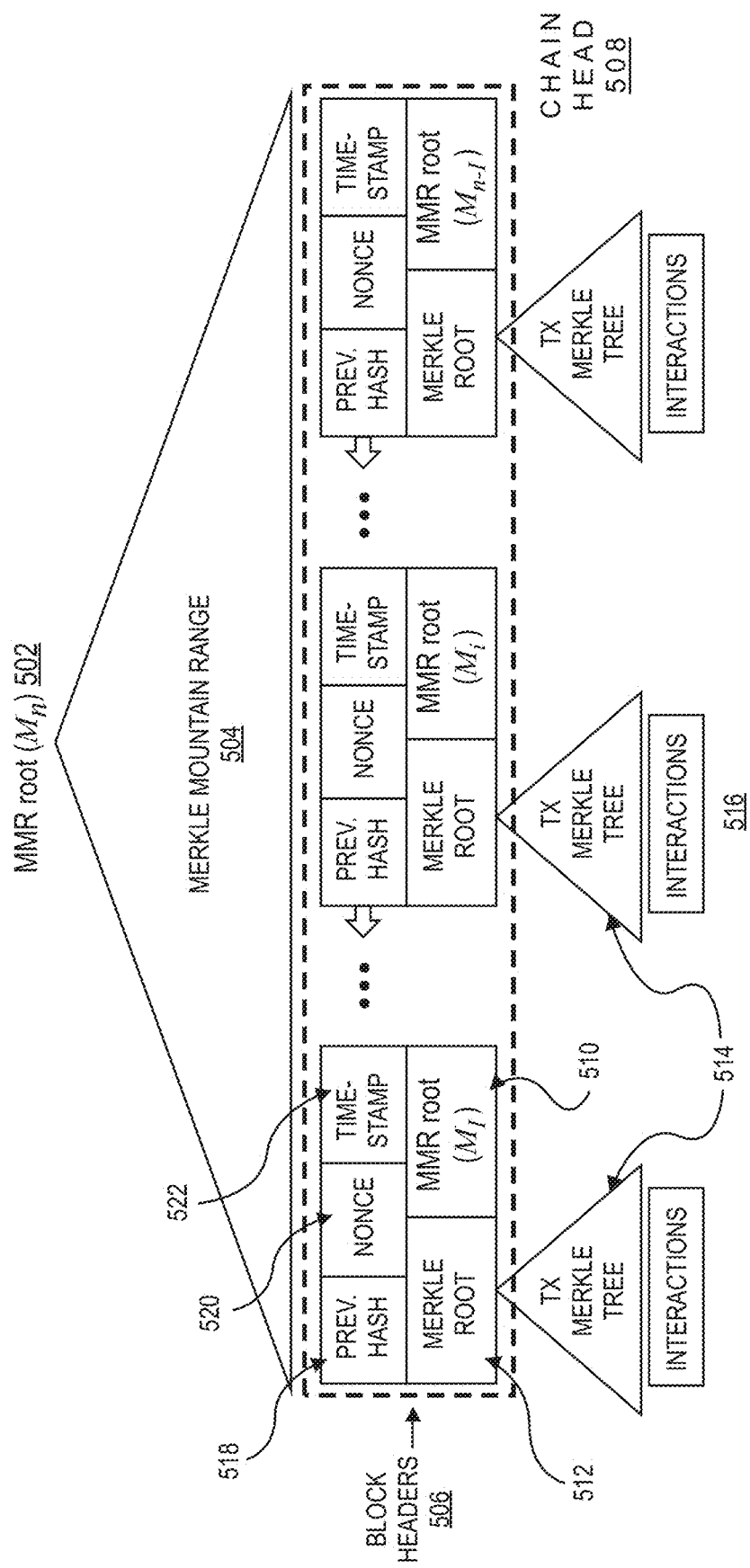
FIG. 5 shows a blockchain structure according to embodiments of the invention.

FIG. 5 shows a blockchain structure according to embodiments of the invention. An MMR root $M_n$ 502 can represent the latest MMR root that is included in the latest block header (not shown) at the chain head 508. A Merkle mountain range 504 can comprise a number of leaves. Each leaf of the Merkle mountain range 504 can be a block header 506. In FIG. 5, the Merkle mountain range 504 includes three block headers, however, it is understood that the Merkle mountain range 504 can include any suitable number of block headers 506, such as 5 block headers, 10 block headers, 100 block headers, 1,000 block headers, or 100,000 block headers.

The block headers 506 include a plurality of block headers associated with a plurality of blocks. Each of the block headers 506 can comprise a MMR root 510, a Merkle root 512, a previous hash 518, a nonce 520, and a timestamp 522. The chain head 508 can be the block header 506 that is associated with the latest block. The block header at the chain head 508 can be the latest block header (not shown). The nonce 520 can be used to calculate if the previous hash 518 contains a string of leading zeros such that it is lower than a difficulty value. The Merkle root 512, the nonce 520, the previous hash 518, and the timestamp 522 can be inputs to a hash function. In some embodiments, the MMR root 510 can also be an input to the hash function. The output of the hash function is valid if the output is less than or equal to a difficulty value. If the resulting previous hash 518 is lower than the difficulty value, then the block is a valid block. The timestamp 522 can be a sequence of characters or encoded information identifying when a certain even occurred, such as when a block is created and added to the blockchain.

The MMR root 510 can be an MMR root of the MMR that commits the block headers of all of the previous blocks. For example, the MMR root at the chain head 508 (i.e., $M_n$) can be the MMR root of the MMR that commits the first block header, the second block header, and the third block header. The Merkle root 512 can be a root of a Merkle tree 514 which is a tree, as described herein, in which every leaf node is labelled with the hash of an interaction 516. Each leaf of the Merkle tree can represent an interaction 516. The interaction 516 can be associated with an interaction identifier. The interaction 516 can be any suitable interaction. For example, a suitable interaction can be a transaction, an agreement, a communication, or any other suitable interaction as described herein. As an example, the interaction 516 can be a transaction that can include information such as the parties involved, a list of transaction inputs, a list of transaction outputs, a fee, a timestamp, a transaction identifier, and/or the like. As another example, an interaction can be an agreement that can include information such as the parties involved, details of the agreement (e.g., text), a digital signature of each party involved, a timestamp, a fee, and/or the like.

III. PROBABILISTIC VERIFICATION OF NON-MALICIOUS FULL NODE

In order to reduce the number of block headers that client devices need to download, embodiments of the invention can employ a probabilistic verification mechanism by which a client device can randomly sample a logarithmic number of block headers. If these block headers are valid, then the block B belongs to the longest chain with high probability. The client device can determine which block headers to sample to prevent the adversary from sampling fake blocks. The probabilistic verification allows for the client device to detect at least one fake block with high probability, if there is a known fraction $f_b$ of blocks are fake, after randomly sampling enough number of blocks.

A. Naive Approach

If the longer chain was created by a cheating prover and the cheating prover was able to pass an initial fact check, such as verifying a predetermined number of the most recent blocks, then the client device can conclude that the latest possible forking point was on or before height $$\frac{L}{c},$$

wherein L is the predetermined number of the most recent blocks and c is the malicious full node's fraction of the total mining power. Given that $f_b$ is established, probabilistic verification can be conducted to detect at least one fake block in an invalid chain with high probability. Specifically, by randomly sampling K blocks from the invalid chain, the probability that all sampled blocks are valid blocks is $(1-f_b)^K$. Hence, the probability that at least one invalid block is sampled is:

$$1-(1-f_b)^K$$

This probability approaches 1 quickly as K grows. Note that a client device can check if a sampled block belongs to the committed chain (i.e., on the same chain with the L blocks in the initial fact check step) based on the MMR commitment in the last block.

To evaluate the performance of the naive approach, the client device can minimize the sum L+K, i.e., the total number of blocks to download. $O(\sqrt{n})$ is the minimum value of L+K that still gives the client device a high probability guarantee. For example, given the Ethereum blockchain with 4,000,000 blocks, one needs to download 18,000 block headers and their proofs to verify if they are on the correct chain. Given that each block header is of size 500 bytes and its proof is of size 7,000 bytes (log n SHA2 hashes), the total data required to download is still significant (i.e., 120 MB) to client devices.

B. Approach According to Embodiments of the Invention

Although the naive approach significantly reduces the number of block headers to download, it still requires a large number of block headers. A goal is to reduce the number of block headers download by the client device to a much smaller value, for example O(log n) block headers. It can now be shown that this is possible by recursively sampling more and more block headers, by a client device, from different intervals of the blockchain maintained by a full node. The goal is to ensure that in each interval of the chain a cheating prover (i.e., a malicious full node) would have to at least create a fraction of the blocks. However, if this fraction is larger than the fraction of the mining power the malicious full node controls then producing these blocks will take longer than the honest network will take to create the blocks. This ensures that the honest network creates the blocks before the malicious full node If the longest chain was created by a malicious full node and the malicious full node was able to pass the initial fact check, then the client device can determine that the latest possible forking point was on or before height $$\frac{L}{c}.$$

The malicious full node will be unable to include any honest chain's blocks in its own blockchain (other than the genesis block). This can be done by iteratively pushing back the latest block the malicious full node could have forked off of.

In some embodiments, the method defines a fraction k such that k>c. The verifier can sample random blocks out of the first $$\frac{L}{c}$$

blocks to ensure that either a cheating prover will be caught or that the cheating prover had to create at least a fraction of k them honestly. The verifier can sample a constant number of blocks. Concretely, to ensure that with probability $1-2^{-\lambda}$ at least a k fraction of the blocks were created, the prover can sample $\lceil -\log_k(2) \cdot \lambda \rceil$ random blocks. For each block, the verifier verifies that the block's MMR is correctly included in the header's MMR and that the proof of work meets the difficulty value, as described herein.

Assuming that the malicious node created a k fraction of the first $$\frac{L}{c}$$

blocks but had a c fraction of the mining power it can be determined that that it took the malicious full node $$\frac{L \cdot k}{c^2} > \frac{L}{c}$$

honest chain block intervals to do this. This, however, implies that the latest possible forking point from the honest chain was at H $$H - \frac{L \cdot k}{c^2}.$$

This process can be repeated m times to ensure that the forking point was before $$H - \frac{L}{c} \cdot \frac{k^m}{c}$$

until it can be ensured that the forking point had to be before the genesis block. This is a contradiction as the genesis block is committed to in the header's MMR and also because the main chain only exists from the genesis block on. Thus, it is not possible for the malicious node to create blocks that occur before the genesis block. Note that this will take $$\log_{\frac{k}{c}}\left(\frac{H \cdot c}{L}\right) = \frac{\log_2\left(\frac{H \cdot c}{L}\right)}{\log_2\left(\frac{k}{c}\right)} = O(\log(H))$$

iterations. In each iteration, a constant number of MMR proof verifications can be performed as well as a constant number of difficulty checks. Since the MMR proof verifications are O(log(H)) in size the asymptotic communication complexity of the protocol is $O(\log(H)^2)$.

Next, the source of randomness will be discussed. Since the probabilistic verification uses randomness for sampling, one solution is for the client device to send the randomness to the full node. The full node can then use the randomness to sample K blocks and send them back to the client device. This prevents the full node from biasing the sampled blocks and avoiding the detection of invalid blocks. However, this mechanism requires interaction between the client device and the full node. Further, the client device and the full node cannot forward the proof to other client devices as the client device and the full node cannot prove that the randomness is actually random. The mechanism to make embodiments of the invention non-interactive, i.e., removing the randomness exchange step between the client device and the full node, will be discussed in further detail below.

1. Probabilistic Sampling

Recall that in the probabilistic sampling model the verifier requests the MMR proof for k random block headers in the blockchain from a full node. The full node can successively partition the blockchain in half and queries another random k block headers from the partition that includes the latest block header. The verifier does this until the size of the partition is at most k (i.e., queries all of the last k blocks). The adversary's computing power is less than the honest network's computing power therefore in order to fool the verifier that the malicious full node has a blockchain equal length to an honest full node's blockchain, the malicious full node must insert bad blocks into their chain, i.e., blocks without proper proofs work.

Theorem 8. The probability the verifier fails (i.e. does not sample any bad block) is $$\leq \left(\frac{1+c}{2}\right)^k.$$

Proof. Let n be the length of the chain and c be the fraction of computing power of the adversary relative to the honest computing power. At any round i in the protocol, the verifier can sample block headers from block $$\frac{n}{2}$$

to block n in the blockchain. Let $h_i$ be the number of bad blocks the adversary has in the interval. Thus the probability the verifier fails to sample a bad block in round i is $$Pr[\text{fail}] = P_i = \left(\frac{\frac{n}{2^i} - h_i}{n/2^i}\right)^k = \left(\frac{n - 2^i h_i}{n}\right)^k.$$

The probability the verifier fails is then $Pr[\text{fail}] = \Pi_{i=0}^{\log_2 n} P_i$. Since each $P_i$ is $\leq 1$, if one $P_i$ is small, then the probability of failure is small.

Let a be the point at which the adversary forks from the mainchain, there is some i such that $$\frac{n}{2^i} \leq a < \frac{n}{2^i} + \frac{n}{2^{i+1}}.$$

In other words, there is some sampled interval of size $$n' = \frac{n}{2^i}$$

in the protocol where the adversary's forking point lies between the start of the interval and the midpoint of the interval. Let l be the length from a to n, i.e. the length of the adversary's fork, $$l > \frac{n}{2^i}.$$

The number of bad blocks in the interval, $$h_i = (1-c)l \geq (1-c)\frac{n'}{2}.$$

Thus, the probability that the verifier fails to catch the adversary is at most the probability the verifier fails at step i, i.e., $$Pr[\text{fail}] \leq Pr[\text{fail at } i] \leq \left(\frac{n' - (1-c)\frac{n'}{2}}{n'}\right)^k = \left(\frac{1+c}{2}\right)^k.$$

Note if l≤k, the verifier will sample all the adversary's bad blocks and Pr[fail]=0.

2. Method

Figure 6:
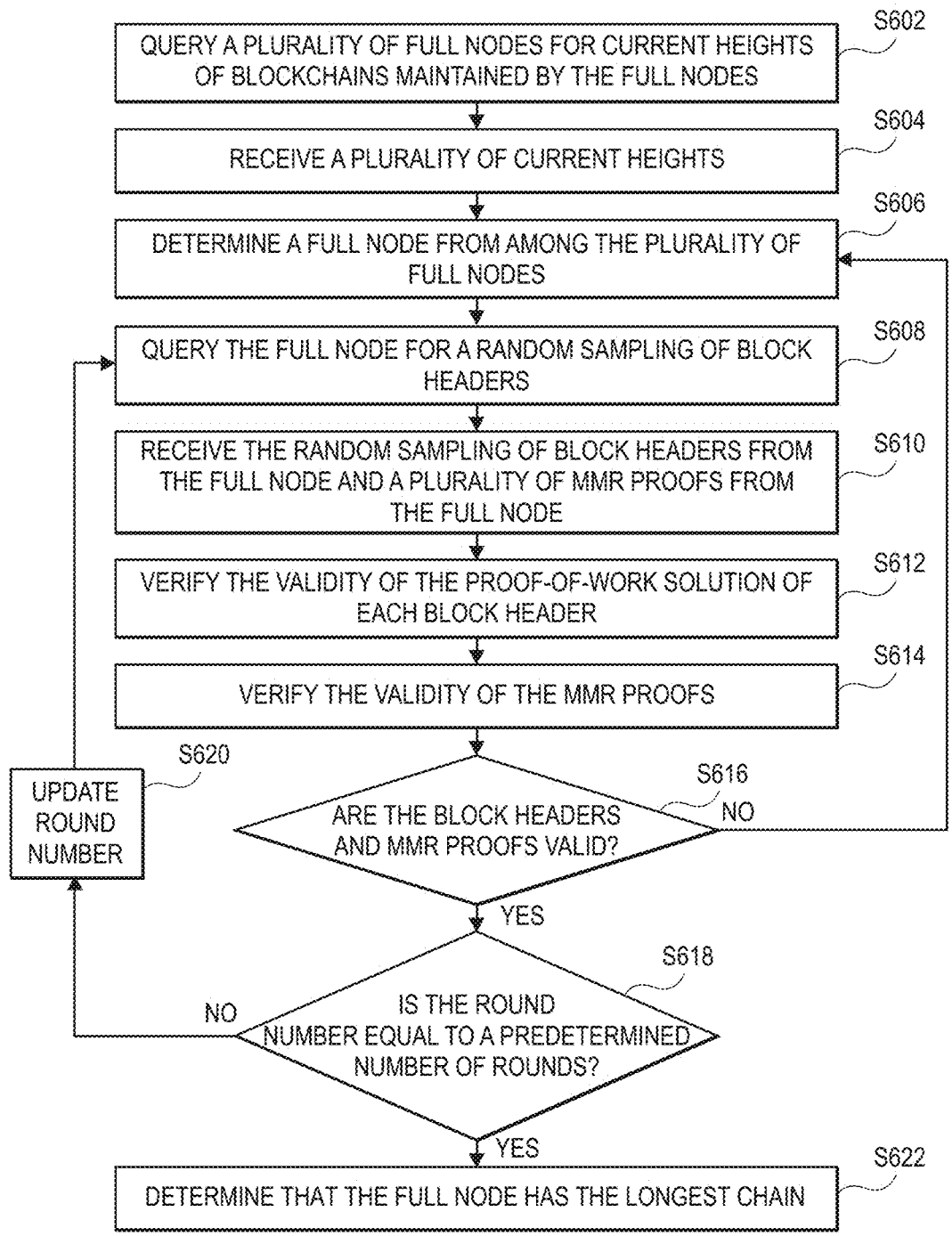
FIG. 6 shows a flowchart of a longest chain verification method according to embodiments of the invention.

FIG. 6 shows a flowchart of a longest chain verification method according to an embodiment of the invention. The method illustrated in FIG. 6 will be described in the context of a client device determining a full node, that maintains the longest blockchain, out of a plurality of full nodes. Although the steps are illustrated in a specific order, it is understood that embodiments of the invention may include methods that have the steps in different orders. In addition, steps may be omitted or added and may still be within embodiments of the invention.

Before step S602, the client device can receive a verification request from a prover, such as a full node or another client device. The verification request can comprise an interaction identifier and, in some embodiments, a Merkle proof associated with the interaction identifier. The interaction identifier can be a unique identifier for an interaction. The interaction identifier (ID) can be, for example, a string of alphanumeric characters, a randomly assigned number, a sequentially assigned number, values corresponding to an interaction, a combination thereof, and/or the like. The Merkle proof can include a path from a Merkle root of a Merkle tree of interactions to a node associated with the interaction identifier as well as siblings of each node in the path, as described herein. In some embodiments, the verification request can further comprise a Merkle mountain range proof including a path from a Merkle mountain range root to a leaf node associated with a block header containing the Merkle tree as well as siblings of each node in the path, as described herein.

Figure 10:
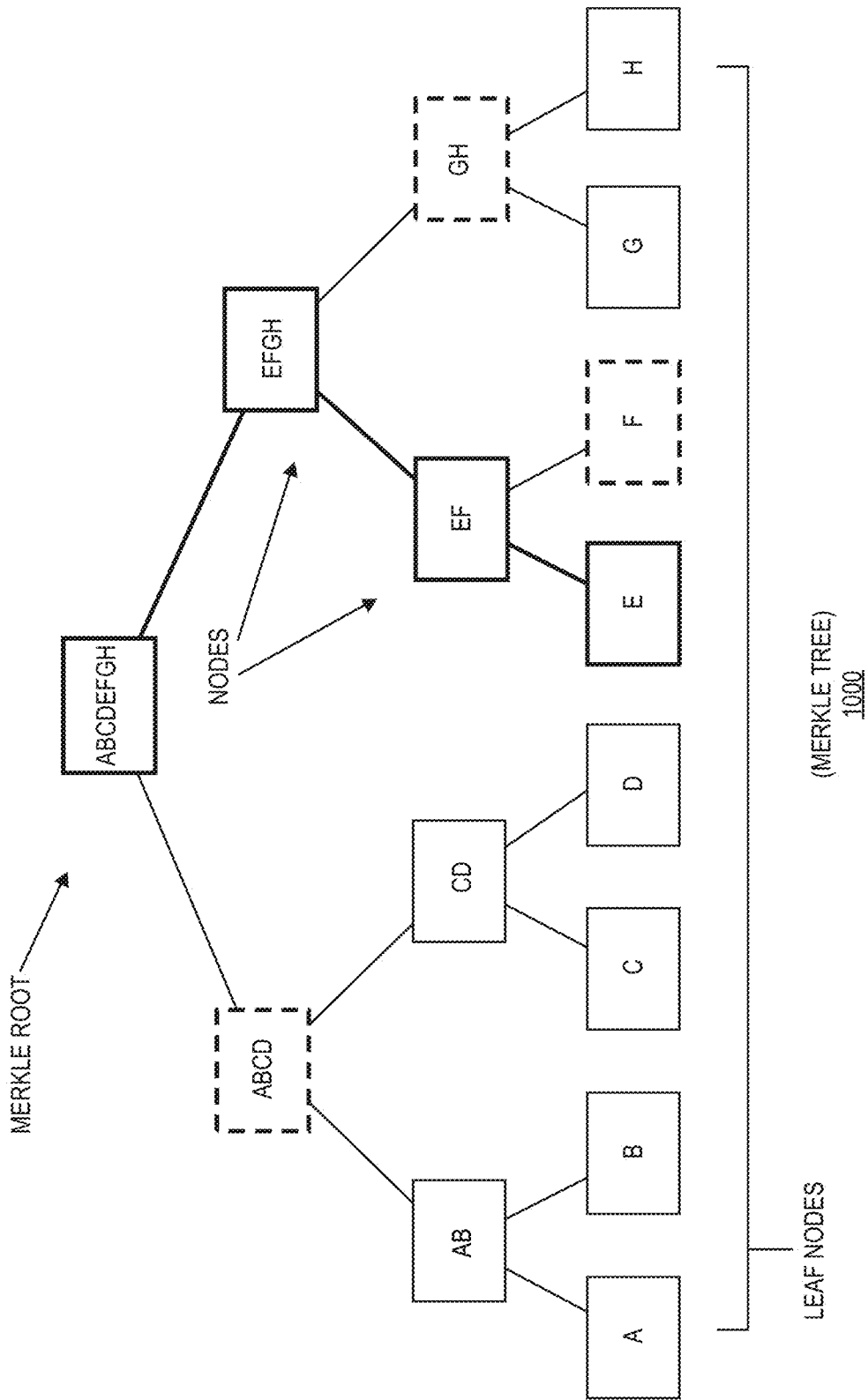
FIG. 10 shows a Merkle tree according to embodiments of the invention.

A Merkle tree 1000 is shown in FIG. 10. The Merkle tree 1000 can comprise a number of leaf nodes such as A, B, C, D, E, F, G, and H. A Merkle proof for an interaction identifier associated with the leaf node E can include a path from the Merkle root ABCDEFG to the leaf node E including the nodes ABCDEFG, EFGH, EF, and E (shown in as the bolded nodes and connection lines in FIG. 10). The Merkle proof can also include the sibling nodes of the nodes in the path. In this example, the sibling nodes include the nodes ABCD, GH, and F (indicated in FIG. 10 by dashed lines).

After receiving the verification request from a prover, the client device can determine a full node that has the longest chain on the blockchain. To determine which full node of a plurality of full nodes has the longest chain, the client device can perform the following steps.

At step S602, the client device can query the plurality of full nodes for current heights of the blockchains maintained by the full nodes. The client device can request the current height of the blockchain n from any suitable number of full nodes in the verification network. The current height of the blockchain n can be the current number of blocks in the blockchain (e.g., 100 blocks, 500 blocks, 1000 blocks, 10,000 blocks, or any other suitable number of blocks). A height of a blockchain can also be referred to as the length of the blockchain. In some embodiments, the client device may query every full node in communication range of the client device. In other embodiments, the client device can query a predetermined number of full nodes, for example, 10 full nodes, 100 full nodes, 500 full nodes, 1000 full nodes, or any suitable number of full nodes. The current height of the blockchain n may be different at each full node. A malicious full node can arbitrarily choose the current height of the blockchain n.

At step S604, after querying the plurality of full nodes for the current height of the blockchain n, the client device can receive a plurality of current heights of the blockchain from the full nodes.

At step S606, the client device can determine a full node from among the plurality of full nodes. The client device can determine which full node reported the correct current height of the blockchain n. In some embodiments, more than one full node may have reported the correct current height of the blockchain n. To determine the correct current height of the blockchain n, the client device can determine a most frequent height of the plurality of current heights. For example, the client device can receive 10 values for the current height of the blockchain n from ten different full nodes, 7 of which can be equal to a height of n=100, 1 of which can be equal to a height of n=95, and 2 of which can be equal to a height of n=101. The client device can determine the most frequent height to be n=100. After determining the most frequent height, the client device can select a full node of the plurality of full nodes that reported the current height comparable to the most frequent height, i.e., a full node with a current height of n=100.

At step S608, after determining the full node, the client device can query the full node for a random sampling of block headers. The query can include a random number $r_j$ and a round number. The random number $r_j$ can be any suitable random number. The round number can correspond to the number of times the client device has requested the random sampling of block headers from the full node. The round number can be any suitable integer. For example, the round number can be 1 for the first time that the client device transmits a request to the full node. The full node can determine the random sampling of block headers, as described herein, and transmit the random sampling of block headers to the client device. In some embodiments, after the full node receives the query for the random sampling of block headers, the full node can partition the blockchain maintained by the full node into an equally sized number of partitions based on the round number. The full node can then select the random sampling of block headers from a most recent partition based on the random number, and then transmit the random sampling of block headers to the client device. The partitioning of the blockchain is described in further detail below.

At step S610, the client device can receive the random sampling of block headers from the full node. In some embodiments, the client device can receive a plurality of Merkle mountain range proofs from the full node. The random sampling of block headers can be determined by the full node as described herein. Each MMR proof of the plurality of MMR proofs can be include a path from a Merkle mountain range root to a node in the MMR associated with one of the block headers of the random sampling of block headers, as well as include a sibling node of each node in the path.

For example, in reference to the third Merkle mountain range 406 of FIG. 4, the client device can receive a block header of a fourth block in the blockchain (i.e., the fourth block header L3) as a part of the random sampling of block headers. The client device can also receive an MMR proof for the fourth block header L3 that includes a path from the MMR root r2 to the fourth block header L3. The path can include each of the white nodes in the third Merkle mountain range 406 of FIG. 4; this includes the MMR root r2, I2 (i.e., the hash of the third block header L2 and the fourth block header L3), as well as the fourth block header L3. The MMR proof also includes the sibling node to each node in the path. The MMR root r2 does not have a sibling node, as it is the root of the third Merkle mountain range 406. The sibling node of I2 (i.e., the hash of the third block header L2 and the fourth block header L3 is I1 (i.e., the hash of the first block header L0 and the second block header L1. The sibling node of the fourth block header L3 is the third block header L2. In the example of the third Merkle mountain range 406 in FIG. 4, the client device receives each node in the third Merkle mountain range 406 except the two nodes of the first block header L0 and the second block header L1.

At step S612, after receiving the random sampling of block headers from the full node, the client device can verify the block headers. In some embodiments, the client device can verify the block headers by verifying the validity of the previous hash value and the nonce (e.g., the PoW solution) of each block header, as described herein. The nonce can be used to calculate if the previous hash contains a string of leading zeros such that it is lower than a difficulty value. If the resulting previous hash is lower than the difficulty value, then the client device can determine that the block header is a valid block header. The Merkle root, the nonce, the previous hash, and the timestamp included in the block header can be inputs to a hash function. In some embodiments, the MMR root can also be an input to the hash function. The output of the hash function is valid if the output is less than or equal to a difficulty value.

At step S614, after verifying the validity of the PoW of each block header of the random sampling of block headers, the client device can verify the validity of the MMR proof for each block header. The client device can verify that each node in the path with two child nodes is equal to the hash of that node's two child nodes. For example, the client device can verify that the node I2 is equal to the hash of both the third block header L2 and the fourth block header L3. The client device can also verify that the MMR root r2 is equal to the hash of I1 and I2. In this way, the client device verifies that each block header of the random sampling of block headers is in the blockchain at the full node. The client device can also verify that the start of the path in the MMR proof is the MMR root in the latest block header.

At step S616, the client device can determine if all of the block headers of the plurality of random block headers and the plurality of Merkle mountain range proofs are valid. If any one of the block headers or the Merkle mountain range proofs is not valid, then the client device can perform steps S606 to S616 again with a different full node, for example, with a second full node. In some embodiments, the client device can add the full node to a stored list of malicious full nodes, for example by adding an IP address, or other full node identifier, of the malicious full node to a list. The client device can determine not to communicate with full nodes that are in the list of malicious full nodes.

If the block headers and the Merkle mountain range proofs are valid, then the client device can proceed to step S618. At step S618, the client device can determine if the round number is equal to a predetermined number of rounds. The predetermined number of rounds can be any suitable integer. In some embodiments, the predetermined number of rounds can be log n rounds, as described herein, wherein n is the current height of the blockchain. If the round number is less than the predetermined number of rounds, the client device can proceed to step S620. If the round number is equal to the predetermined number of rounds, the client device can proceed to step S622.

At step S620, the client device can update the round number. For example, If the round number is equal to 1, then the client device can update the round number to be equal to 2. The client device can then perform steps S608 to S618 again.

At step S622, after determining that the round number is equal to the predetermined number of rounds, the client device can determine that the full node has the longest chain, as the client device has verified block headers during each round with the full node.

Figure 7:
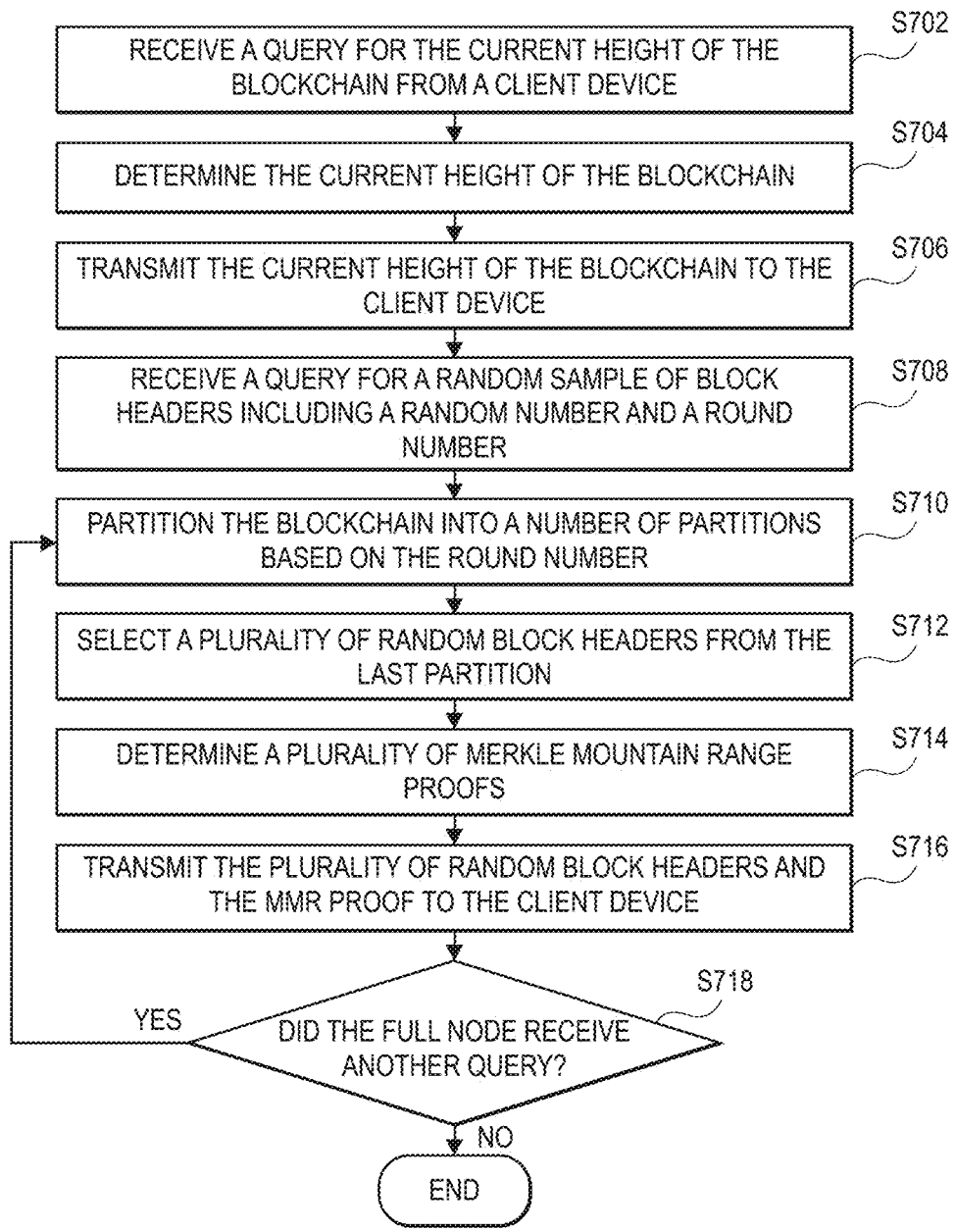
FIG. 7 shows a flowchart of a longest chain verification method performed by a full node according to embodiments of the invention.

FIG. 7 shows a flowchart of a longest chain verification method performed by a full node according to an embodiment of the invention. The method illustrated in FIG. 7 will be described in the context of a full node receiving queries from a client device. It is understood, however, that the invention can be applied to other circumstances such as a full node proving that it holds the longest blockchain. Although the steps are illustrated in a specific order, it is understood that embodiments of the invention may include methods that have the steps in different orders. In addition, steps may be omitted or added and may still be within embodiments of the invention.

At step S702, the full node can receive a query for the current height of the blockchain n from a client device. At step S704, after receiving the query for the current height of the blockchain n, the full node can determine the current height of the blockchain n. The full node can determine the current height of the blockchain n in any suitable manner. For example, the full node can determine the number of blocks in the blockchain. In some embodiments, the full node can determine the number of block headers in the blockchain.

At step S706, after determining the current height of the blockchain n, the full node can transmit the current height of the blockchain n to the client device. The client device, after receiving the current height of the blockchain n, can then determine that the current height of the blockchain reported by the full node is comparable to the most frequent height of a plurality of heights received by the client device from a plurality of full nodes.

At step S708, the full node can receive a query, from the client device, for a random sampling of block headers. The query can include a random number. In some embodiments, the query can include a random number and a round number (i.e., an iteration number). At step S710, the full node can partition the blockchain into a number of partitions based on how many queries for the random sampling of block headers have been received. In some embodiments, the full node can partition the blockchain into a number of partitions based on the round number received by the client device. Each partition of the blockchain can contain the same number of blocks, for example, three partitions each including 10 blocks. In some embodiments, each partition of the blockchain can contain a comparable number of blocks, for example, a first partition including 100 blocks and a second partition including 101 blocks. If the round number is equal to 1, for example, the full node can partition the blockchain into 1 partition, i.e., the partition will include the full blockchain.

At step S712, after partitioning the blockchain into a number of partitions, the full node can select a plurality of random block headers from the last partition. The last partition can be the partition that includes the latest block header. The plurality of random block headers can comprise any suitable number of random block headers. The full node can determine the number of random block headers based on the random number received from the client device. For example, if the random number is equal to a value of 7, then the full node can select 7 random block headers. In other embodiments, the full node can use the random value as an input to a function. The full node can then select a number of random block headers based on the output of the function.

If the round number is equal to 5 and the current height of the blockchain is n=300, for example, then the full node can partition the blockchain into 5 partitions, each of the 5 partitions including 60 blocks. The full node can select a plurality of random block headers from the last partition of 60 blocks. In the next round, the round number will be equal to 6. During this round, the full node can partition the blockchain into 6 partitions, each of the 6 partitions including 50 blocks. The full node can then select a plurality of random block headers from the last partition of 50 blocks. In a certain round (e.g., a final round), the last partition of blocks will include the same number of blocks that the full node is selecting as the random block headers. Due to this, the full node will select the most recent number of block headers, including the latest block header. This method of random sampling allows the full node to select and transmit random block headers to the client device as well as the most recent number of block headers, including the latest block header.

In each subsequent round (i.e., iteration), the full node samples from a smaller and more recent partition of the blockchain. An adversary (i.e., malicious full node) could falsify chain of blocks by creating a fork from the longest chain. The more blocks that the adversary includes in the falsified chain requires more computing power. An adversary may not have large amounts of computing power, and may only be able to falsify shorter chains. These shorter chains will have forks closer to the latest block in the blockchain. As such, the iterative random block header sampling, described herein, allows the client device to verify an increasing number of newer block headers as the partition decreases in size over each iteration. In this way, the client device is likely to catch a falsified shorter chain. During the last round, the client device can receive and verify the most recent number of block headers.

At step S714, the full node can determine a plurality of Merkle mountain range proofs, one MMR proof for each of the random block headers. The full node can determine each node in the MMR that is in a path from the MMR root to the random block header. The path can include each node that is between the MMR root and the random block header in the MMR. The MMR proof can also include the sibling node of each of the nodes in the path. The full node can determine each sibling node of each node in the path in the MMR. The full node can include the path and the sibling nodes in the MMR proof.

At step S716, after determining the plurality of Merkle mountain range proofs, the full node can transmit the plurality of random block headers and the plurality of Merkle mountain range proofs to the client device. At step S718, the full node can determine if another query has been received. The full node can receive another query for a random sampling of block headers. This next query can include a round number equal to a value of 1 larger than the previous round number. The full node can repeat steps S708 to S716 any suitable number of times, as described herein. If the full node does not receive another query for a random sampling of block headers, then the full node can end the process.

Figure 8:
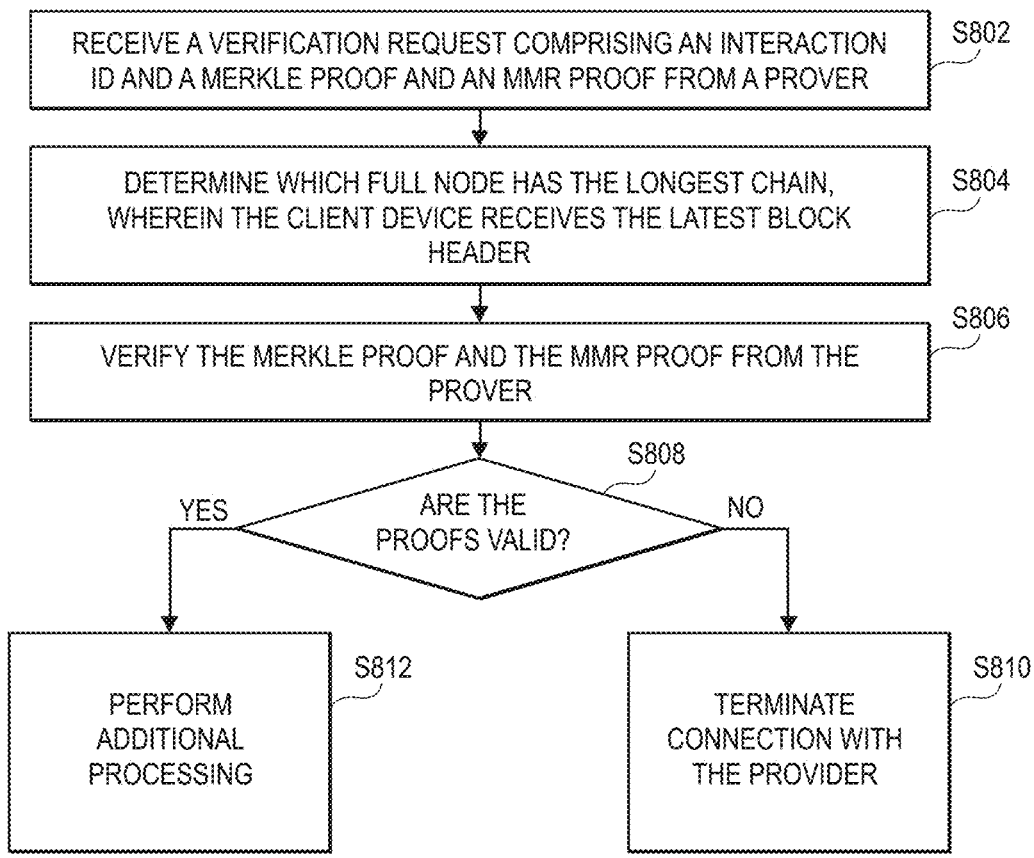
FIG. 8 shows a flowchart of an interaction verification method according to embodiments of the invention.

FIG. 8 shows a flowchart of an interaction verification method according to an embodiment of the invention. The method illustrated in FIG. 8 will be described in the context of a client device receiving a verification request from a prover and proceeding to determine that an interaction is valid. It is understood, however, that the invention can be applied to other circumstances (e.g., verifying that an interaction such as an agreement, contract, transaction, or the like is valid, etc.). Although the steps are illustrated in a specific order, it is understood that embodiments of the invention may include methods that have the steps in different orders. In addition, steps may be omitted or added and may still be within embodiments of the invention.

At step S802, the client device can receive a verification request. The verification request can be received from a prover. In some embodiments, the prover can a full node. In other embodiments, the prover can be a client device. The verification request can comprise an interaction identifier and, in some embodiments, a Merkle proof and a Merkle mountain range proof. The interaction identifier can be a unique identifier for an interaction. The interaction identifier (ID) can be, for example, a string of alphanumeric characters, a randomly assigned number, a sequentially assigned number, values corresponding to an interaction, a combination thereof, and/or the like. The Merkle proof can include a path from a Merkle root to a node associated with the interaction identifier as well as siblings of each node in the path, as described herein. The Merkle mountain range proof can include a path from a Merkle mountain range root to a node associated with a block header containing the Merkle tree as well as siblings of each node in the path, as described herein.

In some embodiments, the verification request can include a Merkle proof comprising a first path and a first plurality of sibling nodes. The first path can include a first plurality of nodes in a Merkle tree from a Merkle root to a first node. The first node can be associated with the interaction identifier. The verification request can also include a Merkle mountain range proof comprising a second path and a second plurality of sibling nodes. The second path can include a second plurality of nodes in a Merkle mountain range from a Merkle mountain range root to a second node. The second node can be associated with a block header containing the interaction identifier.

At step S804, after receiving the verification request, the client device can determine a full node that has the longest chain on the blockchain, as described herein, during which, the client device can receive the latest block header during the last round of querying for the sampling of random block headers.

At step S806, after determining the longest chain maintained by an honest full node as well as receiving the latest block header, the client device can verify the Merkle proof received in the verification request. The client device can verify the Merkle proof by verifying that each node in the path, included in the Merkle proof, with two child nodes is equal to the hash of that node's two child nodes, as described herein. The client device can also verify that the interaction identifier is the leaf node of the path.

The client device can verify the MMR proof received in the verification request, as described herein. The client device can verify the MMR proof by verifying that each node in the path, included in the MMR proof, with two child nodes is equal to the hash of that node's two child nodes. The client device can also verify that the block header is the leaf node of the path, wherein the block header contains the Merkle root of the Merkle tree.

At step S808, if either the Merkle proof or the Merkle mountain range proof are not valid, the client device can proceed to step S810. At step S810, the client device can determine that the prover has provided an incorrect proof and terminate the connection with the prover. In some embodiments, the client device can add the IP address, or other suitable identifier, of the prover to a list of known malicious devices.

If the Merkle proof and the Merkle mountain range proof are valid, the client device can proceed to step S812. The client device can determine that the interaction identifier provided by the prover corresponds with a valid interaction. At step S812, the client device can perform additional processing. Additional processing can include performing an action or operation as indicated in the interaction and/or transferring assets, physical and digital, between the verifier and the prover as outlined in the interaction.

Figure 9:
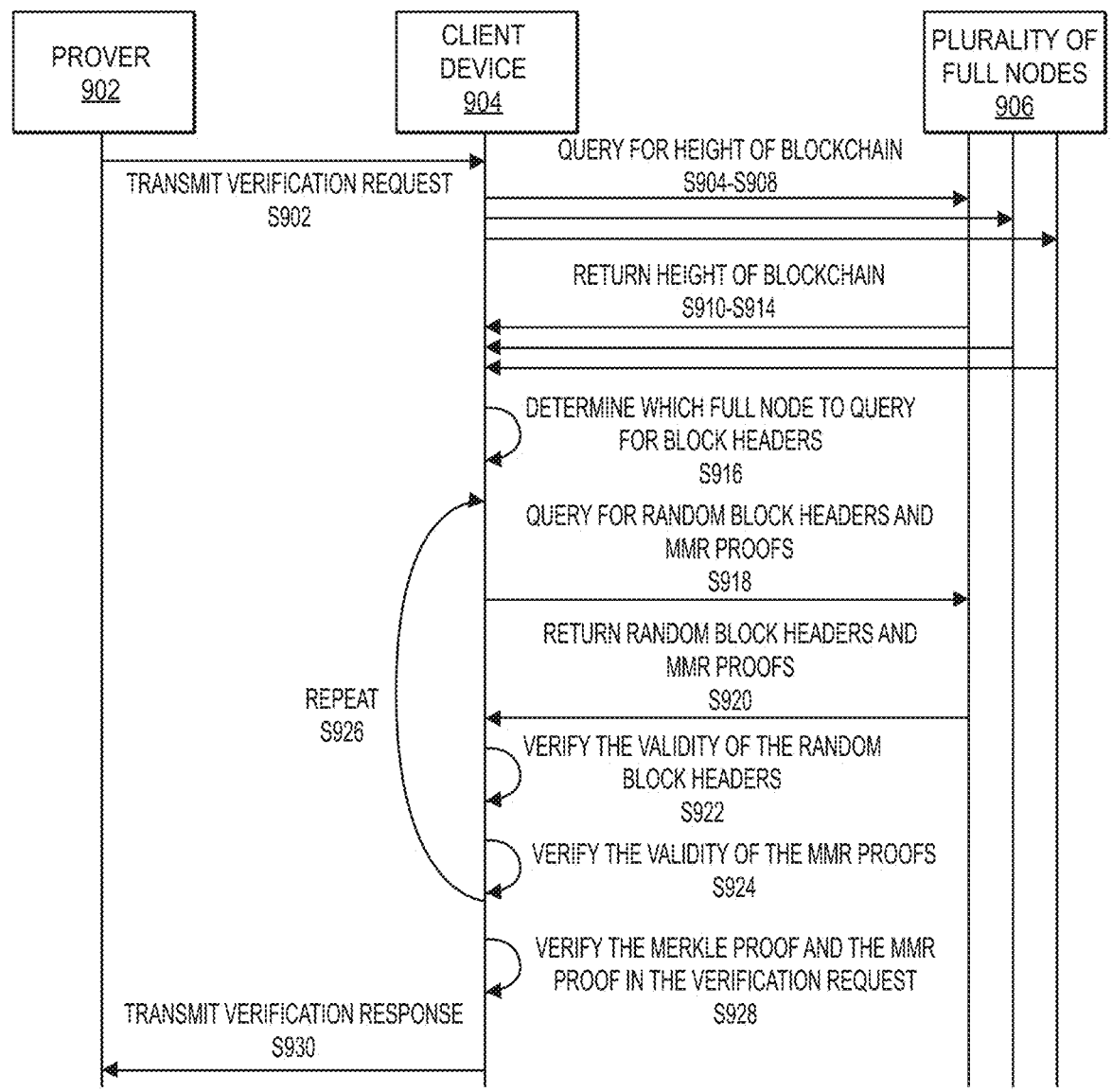
FIG. 9 shows a flow diagram of verifying a longest chain and an interaction according to embodiments of the invention.

FIG. 9 shows a flowchart of a longest chain verification method according to an embodiment of the invention. The method illustrated in FIG. 9 will be described in the context of a client device determining a full node, that maintains the longest blockchain, out of a plurality of full nodes, and then verifying an interaction associated with an interaction identifier received from a prover. Although the steps are illustrated in a specific order, it is understood that embodiments of the invention may include methods that have the steps in different orders. In addition, steps may be omitted or added and may still be within embodiments of the invention.

The method in FIG. 9 can be performed by a prover 902, a client device 904, and a plurality of full nodes. The prover 902 can be a client device or a full node. In some embodiments, the prover 902 can be a full node that the client device 904 communicates with during steps S918-S928.

At step S902, the prover 902 can transmit a verification request to the client device 904. The verification request can comprise an interaction identifier, a Merkle proof, and a Merkle mountain range proof. The interaction identifier can be associated with a previously performed interaction, which may, in some embodiments, be an interaction that was performed between the prover 902 and the client device 904. The Merkle proof can comprise a path and sibling nodes as described herein. The Merkle proof can be used to determine if an interaction is in a block. The Merkle mountain range proof can comprise a path and sibling nodes as described herein. The Merkle mountain range proof can be used to determine if a block is in a blockchain.

At step S904-S908, after receiving the verification request, the client device 904 can query a plurality of full nodes 906 for current heights of blockchains maintained by the full nodes.

At step S910-S914, after the plurality of full nodes 906 receive the query for the current height of the blockchain, each of the full nodes of the plurality of full nodes 906 can return the height of the blockchain. The client device 904 can receive a plurality of current heights.

At step S916, after receiving a plurality of current heights, the client device 904 can determine a full node from among the plurality of full nodes 906. The client device 904 can determine that the full node returned a current height that is consistent with a most frequently returned current height from the plurality of full nodes 906.

At step S918, the client device 904 can query the full node for a random sampling of block headers as well as a plurality of MMR proofs, one MMR proof for each of the block headers of the random sampling of block headers.

At step S920, the client device 904 can receive the random sampling of block headers as well as a MMR proof for each of the block headers.

At step S922, after receiving the random sampling of block headers, the client device 904 can verify the validity of each block header of the random sampling of block headers. The client device 904 can verify that the proof-of-work solution of each block header is valid. For example, the client device 904 can verify that the nonce and the previous hash value solve a hash function such that the solution is less than a predetermined number such as a difficulty level.

At step S924, the client device 904 can verify the validity of the plurality of MMR proofs received from the full node. The client device 904 can verify the validity of the MMR proof for each block header. The client device can verify that each node in the path with two child nodes is equal to the hash of that node's two child nodes, as described herein. The client device 904 can also verify that the start of the path in the MMR proof is the MMR root in the latest block header.

At step S926, after verifying the random block headers and the plurality of MMR proofs, the client device 904 can repeat steps S918-S924 any suitable number of times until a round number is equal to a predetermined number of rounds, for example, 5 rounds, 15 rounds, 40 rounds, or any other suitable number of rounds. In some embodiments, the client device 904 can repeat steps S918-S924 until the client device 904 receives the most recent block header.

At step S928, after repeating steps S918-S924, the client device 904 can determine that the full node maintains the longest (i.e., correct) blockchain. The client device 904 can then verify the Merkle proof and the MMR proof received from the prover 902 in the verification request. The client device can verify the Merkle proof and the MMR proof in any suitable method described herein.

At step S930, after verifying the Merkle proof and the MMR proof, the client device 904 can transmit a verification response to the prover 902. If the Merkle proof and the MMR proof are both valid then the client device 904 can determine that the interaction identifier is associated with a valid interaction. The client device can transmit a verification response indicating that the interaction is valid to the prover 902.

After and/or concurrently with transmitting the verification response, the client device 904 can perform additional processing as described herein. For example, additional processing can include performing an action or operation as indicated in the interaction and/or transferring assets, physical and digital, between the verifier and the prover as outlined in the interaction.

If the client device 904 determines that either the Merkle proof or the MMR proof is invalid, then the client device 904 can transmit a verification response indicating that the interaction is invalid to the prover 902. In some embodiments, the client device 904 may not transmit the verification response if either the Merkle proof or the MMR proof is invalid, in this case, the client device 904 can blacklist the prover 902 and terminate communication therewith.

IV. NON-INTERACTIVE

Embodiments of the invention can allow for a Fiat-Shamir protocol to remove the interaction between the client devices and the full nodes. Specifically, a full node can figure out locally which random blocks it should send to a client device for the verification without any initial randomness from the client device (e.g., in the form of a random number), yet the client device can verify the correctness of the proof and is guaranteed that the full node is not cheating. The Fiat-Shamir protocol will be discussed in further detail below.

In some embodiments, all of the verifier's messages, such as queries, are random from some known distribution. Concretely, in some embodiments these messages are block numbers in some predefined intervals. It is possible to turn an interactive protocol into a non-interactive protocol whose security holds in the random oracle model, see [Amos Fiat and Adi Shamir. How to prove yourself: Practical solutions to identification and signature problems. In *Conference on the Theory and Application of Cryptographic Techniques*, pages 186-194. Springer, 1986.]. Every message of the verifier can be replaced by the result of a query to a random oracle H which in practice is replaced by a hash function such as SHA-3. H can be queried at the current transcript and the oracle's answer is mapped into the verifier's message space. In other words, for some embodiments the queries are the hash of all the previously returned block headers.

V. ANALYSIS

The overhead incurred on full nodes to i) generate new block headers (due to generating the MMR root) and ii) verify the new block headers (due to verification of the MMR root), can be evaluated. We report the experimental results on Table 1, below.

Table 1, below, shows a comparison between embodiments of the invention and previous works. H is the size of a hash (i.e., 256 bits for SHA256) and B is the size of a block header (i.e., 80 bytes in Bitcoin and 528 bytes in Ethereum). c and m can be constants.

TABLE 1

|  | Chain proof size | Event proof size | Interactive | Extra block data |
|---|---|---|---|---|
| PoPoW | mlogn · loglogn · B | mlogn · loglogn · B + logs · H | Yes | logn |
| NIPoPoW | mlogn · loglogn · B | mlogn · loglogn · B + logs · H | No | logn |
| Embodiments of the invention | clognlogn · B | log (n · s) · H | No | 1 · H |

As the number of block headers increases linearly with the size of the blockchain, the resource constraints for current SPV clients also increase. For example, the Ethereum blockchain currently has 6 million blocks, given that each block header is of size 528 bytes, a light client in Ethereum would have to download and store approximately 3 GB to be able to verify all events on the Ethereum blockchain. Such requirements are not trivial for current client devices, such as mobile phones and tablets. Embodiments of the invention include an efficient client device which requires less resource constraints but still offers high security guarantee (e.g., secure against a polynomial-time adversary).

Embodiments of the invention provide for a number of advantages. For example, a client device can download less data than previous light clients (e.g., a light client in Ethereum, described above). A light client in Ethereum downloads approximately 3 GB of data to be able to verify all events on the Ethereum blockchain. According to embodiments of the invention, the client device can download 12 MB, when conservative security parameters are set. As such, compared to Ethereum, client devices according to embodiments of the invention can receive 250 times less data to verify an interaction on the blockchain.

As another example, a client device can download a logarithmic number of block headers, rather than every block header in a blockchain, in order to verify a given block and interaction in the blockchain. This significantly reduces the amount of data transmitted from a full node to a client device, thus not only reducing storage and performance requirements of resource-limited devices, but also reducing network traffic.

Another advantage is that embodiments of the invention are not vulnerable to bribing attacks as in PoPoW. Embodiments of the invention are not vulnerable to bribing attacks, because embodiments do not differentiate between blocks in any way before the blocks are mined. The set of blocks selected to serve as a proof to the client device are determined only after those blocks are mined via a randomness chosen by the client device during transaction verification. Therefore, the adversary will not be able to bribe mines in the verification network to build a blockchain of fake, but valid, blocks.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media Include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising: receiving, by a client device, a verification request comprising an interaction identifier; in response to receiving the verification request, querying, by the client device, a full node for a random sampling of block headers of a blockchain on the full node by transmitting a random number to the full node, wherein the full node partitions the blockchain into a plurality of blockchain partitions including a last partition, the last partition including a latest block header, and then randomly samples block headers equal to the random number from the block headers in the last partition to form the random sampling of block headers, and wherein the full node also determines a plurality of Merkle mountain range proofs associated with the random sampling of block headers and transmits the plurality of Merkle mountain range proofs and the random sampling of block headers to the client device; receiving, by the client device, the random sampling of block headers and the plurality Merkle mountain range proofs from the full node; verifying, by the client device, the random sampling of block headers and the plurality Merkle mountain range proofs; determining that the blockchain maintained by the full node is valid after verifying the random sampling of block headers and the plurality Merkle mountain range proofs; and verifying, by the client device, that the interaction identifier is in a valid block in the blockchain.

2. The method of claim 1 further comprising:
querying, by the client device, a plurality of full nodes for current heights of blockchains maintained by the full nodes;
receiving, by the client device, a plurality of current heights for the blockchains maintained by the full nodes; and
determining, by the client device, the full node from among the plurality of full nodes.

3. The method of claim 2, wherein determining the full node further comprises:
determining, by the client device, a most frequent height of the plurality of current heights; and
selecting, by the client device, the full node of the plurality of full nodes that reported a current height comparable to the most frequent height.

4. The method of claim 1, wherein the verification request includes a Merkle proof comprising a first path and a first plurality of sibling graph nodes, the first path including a first plurality of graph nodes in a Merkle tree from a Merkle root to a first graph node, the first graph node associated with the interaction identifier,
and wherein the verification request includes a Merkle mountain range proof comprising a second path and a second plurality of sibling graph nodes, the second path including a second plurality of graph nodes in a Merkle mountain range from a Merkle mountain range root to a second graph node, the second graph node associated with a block header containing the interaction identifier.

5. The method of claim 4 further comprising:
verifying, by the client device, the Merkle proof;
verifying, by the client device, the Merkle mountain range proof;
determining, by the client device, when the interaction identifier corresponds to a valid interaction based on verification of the Merkle proof and the Merkle mountain range proof; and
transmitting, by the client device, a verification response indicating whether or not the interaction identifier corresponds to the valid interaction.

6. The method of claim 1, wherein after verifying the random sampling of block headers the method further comprises:
repeating, by the client device, the querying, receiving, and verifying steps, for a predetermined number of rounds.

7. The method of claim 1,
wherein the full node blockchain partitions are substantially equally sized.

8. The method of claim 1 further comprising:
performing, by the client device, additional processing based on an interaction associated with the interaction identifier, wherein the additional processing includes performing an action or operation as indicated in the interaction or transferring assets between the client device and a prover as outlined in the interaction.

9. The method of claim 1, wherein each block header of the random sampling of block headers comprises a previous hash value, a nonce, a timestamp, a Merkle root, and a Merkle mountain range root.

10. The method of claim 9 further comprising:
wherein verifying the random sampling of block headers further comprises:
verifying, by the client device, validity of the previous hash value and the nonce.

11. The method of claim 1 further comprising:
performing, by the client device, additional processing based on an interaction associated with the interaction identifier, wherein the additional processing includes transferring assets between the client device and a prover as outlined in the interaction.

12. The method of claim 1 further comprising:
performing, by the client device, additional processing based on an interaction associated with the interaction identifier, wherein the additional processing includes transferring assets between a merchant operating the client device and a prover operating a prover device, wherein the interaction is a payment transaction, and wherein the prover previously paid the merchant for a resource in the payment transaction.

13. A client device comprising: a processor; a memory; and a computer readable medium coupled to the processor, the computer readable medium comprising code, executable by the processor, for implementing a method comprising: receiving a verification request comprising an interaction identifier; in response to receiving the verification request, querying a full node for a random sampling of block headers of a blockchain on the full node by transmitting a random number to the full node, wherein the full node partitions the blockchain into a plurality of blockchain partitions including a last partition, the last partition including a latest block header, and then-randomly samples block headers equal to the random number from the block headers in the last partition to form the random sampling of block headers, and wherein the full node also determines a plurality of Merkle mountain range proofs associated with the random sampling of block headers and transmits the plurality of Merkle mountain range proofs and the random sampling of block headers to the client device; receiving the random sampling of block headers and the plurality Merkle mountain range proofs from the full node; verifying the random sampling of block headers and the plurality Merkle mountain range proofs; determining that the blockchain maintained by the full node is valid after verifying the random sampling of block headers and the plurality Merkle mountain range proofs; and verifying that the interaction identifier is in a valid block in the blockchain.

14. The client device of claim 13, wherein the method further comprises:
querying a plurality of full nodes for current heights of blockchains maintained by the full nodes;
receiving a plurality of current heights for the blockchains maintained by the full nodes; and
determining the full node from among the plurality of full nodes.

15. The client device of claim 14, wherein determining the full node further comprises:
determining, by the client device, a most frequent height of the plurality of current heights; and
selecting, by the client device, the full node of the plurality of full nodes that reported a current height comparable to the most frequent height.

16. A method comprising: receiving, by a full node from a client device, a query for a random sampling of block headers on a blockchain, the query including a random number, partitioning, by the full node, the blockchain into a plurality of blockchain partitions including a last partition, the last partition including a latest block header; randomly sampling of block headers from the block headers in the last partition equal to the random number to form the random sampling of block headers; determining, by the full node, a plurality of Merkle mountain range proofs associated with the random sampling of block headers; and transmitting, by the full node, the random sampling of block headers and the plurality of Merkle mountain range proofs to the client device, wherein the client device verifies the random sampling of block headers and the plurality of Merkle mountain range proofs.

17. The method of claim 16, wherein the blockchain partitions are of substantially equal size.

18. The method of claim 17, wherein the blockchain is partitioned into the partitions based on a number of queries received.

19. The method of claim 17 further comprising:
determining, by the full node, that a number of blocks in the most recent partition is substantially equivalent to a number of block headers included in the random sampling of block headers.

20. The method of claim 16 further comprising:
receiving, by the full node, a query for a current height of the blockchain from the client device;
determining, by the full node, the current height of the blockchain; and
transmitting, by the full node, the current height of the blockchain to the client device, wherein the client device determines when the current height of the blockchain is substantially equivalent to a plurality of current heights received from a plurality of full nodes.

* * * * *